US012632020B2

(12) United States Patent
Telschig

(10) Patent No.: US 12,632,020 B2
(45) Date of Patent: May 19, 2026

(54) INDUSTRIAL CONTROL DEVICE, INDUSTRIAL CONTROL SYSTEM AND METHOD OF OPERATING THE SAME

(71) Applicant: Siemens Aktiengesellschaft, Munich (DE)

(72) Inventor: Kilian Telschig, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 478 days.

(21) Appl. No.: 18/223,236

(22) Filed: Jul. 18, 2023

(65) Prior Publication Data

US 2024/0036535 A1     Feb. 1, 2024

(30) Foreign Application Priority Data

Jul. 28, 2022     (EP) ...................................... 22187386

(51) Int. Cl.
*G05B 19/02*     (2006.01)
*G05B 15/02*     (2006.01)
*G05B 19/418*     (2006.01)

(52) U.S. Cl.
CPC ................................... *G05B 15/02* (2013.01)

(58) Field of Classification Search
None
See application file for complete search history.

(56) References Cited

U.S. PATENT DOCUMENTS

| | | | | |
|---|---|---|---|---|
| 9,537,776 B2 * | 1/2017 | Alsup | ...................... | H04L 47/13 |
| 2018/0165110 A1 * | 6/2018 | Htay | .......................... | G06F 8/65 |
| 2020/0089631 A1 * | 3/2020 | Jerolm | .................. | H04L 49/251 |
| 2020/0099762 A1 | 3/2020 | Eckhardt et al. | | |
| 2020/0371487 A1 * | 11/2020 | Boelderl-Ermel | .... | H04L 9/3247 |
| 2022/0404790 A1 * | 12/2022 | Amaro, Jr. | .............. | H04L 43/20 |

OTHER PUBLICATIONS

M. Bredel, Z. Bozakov and Y. Jiang, "Analyzing router performance using network calculus with external measurements," 2010, IEEE 18th International Workshop on Quality of Service (IWQoS), Beijing, China, pp. 1-9 (Year: 2010).*

(Continued)

*Primary Examiner* — Ariel Mercado-Vargas
(74) *Attorney, Agent, or Firm* — Schmeiser, Olsen & Watts LLP

(57)     ABSTRACT
An industrial control device executes a number of containerized control applications in constant cycles and includes: queuing disciplines associated with a respective network interface, which manage incoming or outgoing network packets in a queue and hold back network packets having a timestamp not older than a barrier timestamp; and an agent that performs, in each cycle, first performs maintenance processing and then executes the control applications for a remainder of the cycle. The maintenance processing includes I/O processing with a technical device on behalf of the control applications and transmitting, to each of the queuing disciplines, a move command instructing advancement of the barrier timestamp and including a timestamp indicating a start time of the respective cycle. The queuing disciplines adjust their barrier timestamps based on the received start time. Time-deterministic behavior is achieved in an efficient manner.

15 Claims, 13 Drawing Sheets

(56)             References Cited

OTHER PUBLICATIONS

L. Lo Bello and W. Steiner, "A Perspective on IEEE Time-Sensitive Networking for Industrial Communication and Automation Systems," Jun. 2019, Proceedings of the IEEE, vol. 107, No. 6, pp. 1094-1120. (Year: 2019).*

R. N. Gore, E. Lisova, J. Åkerberg and M. Björkman, "Delay and Jitter Analysis in Industrial Control Systems: A Paper Mill Case Study," 2021, 17th IEEE International Conference on Factory Communication Systems (WFCS), Linz, Austria, pp. 99-106. (Year: 2021).*

Kilian Telschig et al.: "Synchronous Reconfiguration of Distributed Embedded Applications during Operation", 2019, IEEE International Conference on Software Architecture (ICSA), 978-1-7281-0528-4/19.

Arestova Anna et al: "A Service-Oriented Real-Time Communication Scheme for AUTOSAR Adaptive Using OPC UA and Time-Sensitive Networking", Sensors, vol. 21, No. 7, Mar. 27, 2021 (Mar. 27, 2021), p. 2337, XP055892796, DOI: 10.3390/s21072337.

Kilian Telschig et al.: "Towards Safe Dynamic Updates of Distributed Updates of Distributed Embedded Applications in Factory Automation", 2017, 22nd IEEE International Conference on Emerging Technologies and Factory Automation, 978-1-5090-6505-9/17.

Kilian Telschig et al.: "A Real-Time Container Architecture for Dependable Distributed Embedded Applications", 2018, 14th IEEE International Conference on Automation Science and Engineering (CASE), 978-1-5386-3593-3/18, pp. 1367-1374.

Kilian Telschig et al.: "Time-Critical State Transfer during Operation of Distributed Embedded Applications", 2019, 17th IEEE International Conference on Industrial Informatics (INDIN), 978-1-7281-2927-3/19.

Arestova Anna et al: "ITANS: Incremental Task and Network Scheduling for Time-Sensitive Networks", IEEE Open Journal of Intelligent Transportation Systems, IEEE, vol. 3, Apr. 28, 2022 (Apr. 28, 2022), pp. 369-387, XP011907999, DOI: 10.1109/OJITS.2022.3171072.

* cited by examiner

INDUSTRIAL CONTROL DEVICE, INDUSTRIAL CONTROL SYSTEM AND METHOD OF OPERATING THE SAME

CROSS-REFERENCE TO RELATED APPLICATIONS

This application claims priority to EP Application No. 22187386.2, having a filing date of Jul. 28, 2022, the entire contents of which are hereby incorporated by reference.

FIELD OF TECHNOLOGY

The following relates to the field of app-based industrial control systems with real-time requirements. More particularly, the following relates to an industrial control device, an industrial control system, a method of operating the same, and a computer program product.

BACKGROUND

In an industrial control system with real-time requirements, a plurality of control applications installed on a plurality of interconnected industrial control devices periodically perform input and output operations with a respective technical device connected to the respective industrial control device. Also, the control applications communicate with each other by exchanging network packets according to, for example, the Universal Datagram Protocol, UDP. Herein, sender-receiver relationships are advantageously transparent to the control applications. That is, the control applications may be unaware of who their communication partner is, how many of them there are, and what their Internet Protocol addresses are. The control applications transmit UDP packets having a predefined identifier to a dummy address or the like, and an agent takes care of network address translation, multicasting and the like so as to route the UDP network packets to one or more desired recipient control applications based on the predefined identifiers in the UDP network packets and in accordance with a configuration plan of the industrial control system.

During a reconfiguration of the industrial control system, when technical devices are taken in and out of service, these changes are mirrored by corresponding reconfigurations of the control applications. That is, the configuration plan of the industrial control system according to which the agent causes routing of the network packets is changed. Herein, a problem arises in that network packets may be underway while the changed configuration plan is being implemented. It is therefore not clear whether a network packet that is underway will be routed according to the old rules before or according to the changed rules after the reconfiguration. However, in an industrial control system, time-deterministic behavior is required in case of a reconfiguration.

Herein, time-deterministic behavior means, on the one hand, that network packets transmitted during a given cycle should reliably reach the recipient in a well-defined cycle, which may be exactly one of the same cycle, the next cycle or the next-after-next cycle (time-deterministic delivery of network packets). Furthermore, time-deterministic behavior means that a reconfiguration can be performed such that a control application that is taken into service starts receiving network packets from the cycle before in which it is taken into service and that no network packets are routed to a control application that is taken out of service from the cycle in which it is taken out of service (time-deterministic re-routing of network packets in case of reconfiguration).

A conventional approach to achieving time-deterministic behavior in a real-time industrial control system is subdividing the cycle into smaller time cycles, reserving a time slice for communication, a time slice for reconfiguration and a time slice for processing. However, this results in over-provisioning, the cycle becomes long, and valuable CPU time is wasted.

WO2022/053335 discloses using a message bus enabling serialized publish/subscribe topic-based communication to achieve a precise timing of handover between control apps that are taken into and out of service.

Further background art is recited in the literature list at the end of the description.

SUMMARY

Accordingly, an aspect relates to provide means for achieving time-deterministic behavior in an industrial control system in an efficient manner.

According to a first aspect, an industrial control device for an industrial control system comprising a plurality of industrial control devices is proposed. The proposed industrial control device is configured to execute a number of control applications in constant cycles and comprising: a number of containers each containerizing a respective one of the control applications; a number of network interfaces comprising a physical network interface of the industrial control device and a number of virtual network interfaces of the respective containers; a number of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline; a real-time container agent configured to, in each cycle, perform maintenance processing and to cause execution of each of the control applications for a remainder of the cycle only after having finished the maintenance processing, wherein the maintenance processing comprises: performing, on behalf of the control applications, output processing and input processing with a technical device connected to the industrial control device, and transmitting, to each of the queuing disciplines, a move command instructing the respective queuing discipline to advance its barrier timestamp, wherein the move command comprises a timestamp indicating a logical execution time, which is the start time of the respective cycle, and the respective queuing discipline is configured to, in response to receiving the move command, adjust its barrier timestamp based on the logical execution time indicated by the timestamp comprised in the move command.

With the proposed industrial control device, time deterministic behavior can be achieved in an industrial control network both for network packet exchange and for reconfigurations, while maximizing use of the processing time available in each cycle on each industrial control device. Therefore, time-deterministic behavior can be achieved in an efficient manner.

More particularly, the maintenance processing of the real-time container and the control applications may be executed consecutively in a single-threaded manner, thereby facilitating time-deterministic behavior. That is, input/output operations with the technical device are performed while the control applications are quiescent (are halted and/or not being executed). Furthermore, reconfigurations can be performed by the real-time container agent as part of the maintenance processing while the control applications are quiescent. On the other hand, executing of the control applications can start as soon as the maintenance processing is finished, thereby advantageously not requiring fixed time slices for maintenance processing and for control application execution, thus advantageously avoiding over-provisioning. However, the queuing disciplines as well as an operating system of the industrial control device and components thereof, such as a network stack, are, in particular, allowed to operate in parallel to the real-time container agent and the containerized control apps. Thus, the network packets can travel in background without requiring a time slice to be reserved for network packet propagation and not even being limited by the cycles. On the other hand, the queuing disciplines hold back network packets that have a time stamp of or newer than the barrier time stamp. The barrier timestamp is moved by the real-time container agent once per cycle. Thus, the non-deterministic propagation times of the network packets within the industrial control device and/or across a physical network are mostly levelled out and network packets can be delivered deterministically in batches each cycle.

However, the inventors have identified a case wherein despite these measures, a network packet transmitted by one of the control applications is delivered to another control application either in one or in another cycle, such as either in the next or in the second next cycle, or such as either in the same or in the next cycle, depending on non-deterministic circumstances.

More specifically, when the queuing discipline moves its barrier timestamp merely to a current time in response the move command, different queuing disciplines in the same or in different industrial control devices may establish different barrier timestamps, and a race condition may arise. Also, a further race condition may arise because, depending on an internal timing of a network stack or the like, an incoming network packet may be released, within a given cycle, either before or after the time at which the move command is received.

Therefore, according to the proposed industrial control device, the move command comprises a timestamp indicating the start time of the respective cycle, which will be named "logical execution time" hereinbelow. This advantageously allows a plurality of queuing disciplines to adjust their barrier timestamps to a same barrier timestamp. Furthermore, using the logical executing time, the barrier timestamp may advantageously be adjusted at the borders of the cycle, i.e., at either the start or at the end of the cycle, such that during any given cycle, any incoming network packet will always be received either always after or always before the barrier timestamp.

Thus, the time-deterministic behavior of the industrial control device may be advantageously improved.

In particular, the industrial control device may be a computing device, such as an industrial personal computer or an embedded device, that is configured to execute an operating system having a network stack, such as a custom version of the Linux operating system. The network stack may be configured to forward network packets between the virtual network interfaces and the physical network interface of the industrial control device.

The network packets may be any suitable kind of network packets. In particular, the network packets may be UDP network packets. More particularly, the network packets that are transmitted by the control applications may be network packets addressed to dummy addresses and dummy ports and that comprise an identifier (control applications do not need to be aware of who consumes their outputs). A firewall installed on the industrial control device or, in exemplary embodiments, a rule-based network packet processing carried out by the queuing disciplines upon dequeuing, may match the network packets based on the identifiers and may re-write matching packet's headers according to a communication mapping of the industrial control system, thereby implementing orchestration of the industrial control system.

In particular, the queuing discipline may be a unit that is configured to enqueue network packets, temporarily hold the enqueued networks in the queue, and to dequeue network packets upon request.

In particular, the queuing discipline may be requested by the operating system or a component thereof, when a network packet is about to pass or has passed through the associated network interface, to enqueue and/or dequeue the network packet.

In particular, the queuing discipline may operate according to a FIFO (first in first out) principle, in which network packets are enqueued at one end of the queue and are dequeued at the other end of the queue.

In particular, the operating system, the network stack, the queuing discipline, and the like may not operate in cycles, but may operate continuously in parallel to the processing of the real-time container agent and the control applications that is executed in cycles.

In the present application, the expression "a number of" refers to a number of one or more, or to $N \geq 1$, or to one of a singularity and a plurality.

In particular, a respective container may containerize a respective control application by forming an abstraction layer that isolates the control application from other control applications hosted on the same industrial control device. Each containerized control application may be limited to access only a respective part of resources, such as CPU, memory, input/output, and network bandwidth, of the industrial control device. Direct access of the containerized control application to the accessible part of the resources of the industrial control device may be disallowed. Access to the accessible part of the resources of the industrial control system may only be possible via the abstraction layer formed by the container.

In particular, the number of network interfaces of the industrial control devices may be interconnected.

In particular, the timestamp of each network packet may be a timestamp that is created when an egress network packet is created for transmission via one of the network interfaces or when an ingress network packet is received at one of the network interfaces. Alternatively, the timestamp of each network packet may be created by the respective queuing disciplines upon enqueuing the respective network packet.

In particular, the real-time container agent may be a unit that configures the industrial control device to execute the containerized control applications in constant cycles.

More particularly, the maintenance processing may further comprise establishing, by the real-time container agent, a start time of each cycle (the logical execution time) and a length of each cycle, such as for example based on a clock of the industrial control device.

More particularly, the maintenance processing may further comprise performing, by the real-time container agent, a reconfiguration of how network packets are handled on the industrial control device in response to receiving an updated communication mapping of the industrial control system. For example, the real-time container agent may reconfigure a routing table, a firewall or the like of the operating system of the industrial control device.

In particular, the real-time container agent may perform the output processing and input processing on behalf of the respective control application by using an abstraction layer formed by the container that containerizes the respective control application. For example, the real-time container agent may read outputs from a virtual Linux GPIO filesystem of the abstraction layer and transmit the read outputs to the technical device, and the real-time container agent may receive inputs from the technical device and write the inputs into the virtual GPIO filesystem. In this way, the control applications may use the standardized GPIO interface to perform virtual output processing and input processing. However, the actual output processing and input processing that controls the technical device is performed by the realtime container agent during the maintenance processing.

In particular, the technical device may be any industrial device that lends itself to control by an industrial control device or system. Examples for the technical device include an actor, a sensor, a switch, and various components larger systems such as a robot, a factory, a gas turbine, a wind turbine generator, a chemical plant, a processing plant, a power plant, a power grid or the like.

In particular, causing execution of each of the control applications for a remainder of the cycle may comprise spawning and/or resuming executing of a respective control application when the maintenance processing is finished; and may comprise terminating and/or suspending execution of the control application prior to an end of the cycle. POSIX-based SIGTERM, SIGSUSPEND, SIGRESUME signals may be used to implement the terminating, suspending and resuming, for example.

The way in which the move command is transmitted to the queuing disciplines is not particularly limited. For example, the move command may be transmitted using a socket that connects the real-time container agent with the respective queuing discipline; by the real-time container agent calling an application programming interface published by the respective queuing discipline; by the real-time container agent raising a flag and writing a value to a shared memory area or by any other suitable means that ensures a swift communication between the real-time container agent and the respective queuing discipline. Herein, "swift communication" shall mean that the move command is prioritized over the network packets and does not have to undergo queuing or the like.

In particular, a length of the constant cycles may be suitably selected. Advantageous cycle lengths that could be achieved with the proposed industrial control system include a cycle length of 100 milliseconds, more of 50 milliseconds, and most of 10 milliseconds.

According to an embodiment, the maintenance processing comprises synchronizing the start time of each cycle with real-time container agents of the other industrial control devices of the industrial control system.

Thereby, an isochronous timing may be achieved advantageously throughout the entire industrial control devices. That is, the logical execution time may be the same on all the industrial control devices, thereby facilitating time-deterministic behavior across the entire industrial control system.

According to a further embodiment, the respective queuing discipline is configured to, upon enqueuing a network packet that does not yet have a timestamp, associate a timestamp to the network packet that indicates a current time.

Thus, the queuing disciplines can advantageously decide whether to hold back a network packet or not based on the cycle in which the network packet was enqueued.

According to a further embodiment, the respective queuing discipline is configured to set the logical execution time of the current cycle or the logical execution time of the next cycle as its barrier timestamp.

Thus, advantageously, time-deterministic delivery of network packets may be improved. The barrier timestamps are set to borders (start time or end time) of the present cycle. Thus, all network packets transmitted or received within the present cycle are treated the same way the respective queuing discipline.

According to a further embodiment, the number of queuing disciplines comprises: a common ingress queuing discipline associated with the physical network interface of the industrial control device and configured to manage network packets that are incoming via the physical network interface in a queue; and a respective egress queuing discipline associated with each of the virtual network interfaces of each of the containers and configured to manage network packets that are outgoing via the respective virtual network interface in a queue.

The common ingress queue associated with the physical network interface advantageously enables time-deterministic multicasting in an industrial control system. Separate egress queues for each of the containerized apps advantageously enable time-deterministic multicasting of local network packets transmitted between containerized control applications of the same industrial control devices.

According to a further embodiment, the common ingress queuing discipline is further associated with each of the virtual network interfaces, comprises a first queue and a second queue and is configured to: enqueue local network packets incoming via one of the virtual network interfaces and outgoing via another one of the virtual network interfaces in the first queue, enqueue remote network packets incoming via the physical network interface in the second queue, maintain a first barrier timestamp used for holding back the local network packets in the first queue and a second barrier timestamp used for holding back the remote network packets in the second queue, and, in response to receiving the move command, set the first barrier timestamp to the logical execution time of the next cycle and set the second barrier timestamp to the logical execution time of the current cycle.

In particular, having the logical execution time as the first barrier timestamp that is applied to remote network packets advantageously enables remote network packets, which are transmitted between different industrial control devices, to be delivered to a receiving control application, in a time-deterministic manner, and more particularly two cycles after the cycle in which they were send by the transmitting control application.

In particular, having the logical execution time of the next cycle as the second barrier timestamp that is applied to local network packets advantageously enables local network packets, which are transmitted between control applications of the same industrial control device, to be delivered to the receiving control application, in a time-deterministic manner, and more particularly in the next cycle after the cycle in which they were sent by the transmitting control application.

In this situation where different barrier timestamps are applied to different types of network packets, in particular, sorting the different type of network packets into two different queues may advantageously increase performance of the common ingress queuing discipline. The common ingress queuing discipline may keep each of the queues sorted by timestamps. Thus, in case of a dequeuing request, only the first network packet in each of the queues need to be checked to determine whether a network packet is to be dequeued or not.

In particular, a case wherein the common ingress queuing discipline is "associated with a plurality of network interfaces", such as the virtual network interface and the physical network interfaces, also comprises a case wherein the common ingress queuing discipline is directly associated only with one network interface, and is indirectly associated with the other network interfaces.

"Direct association" may be implemented by using the Linux qdisc API, for example. "Indirect association" may be implemented by using a mirroring redirection, such as the Linux mirred API, so as to "clone" or "steal" network packets from the other network interfaces and feed them to the one network interface.

The one network interface may be one of the number of virtual network interfaces, the physical network interface, and a further dummy virtual network interface.

According to a further embodiment, the maintenance processing comprises, in the following order: an output processing step of performing the output processing with the technical device and transmitting the move command to each of the egress queueing disciplines; and an input processing step of performing the input processing with the technical device and transmitting the move command to the common ingress queuing discipline.

In particular, the output processing step may be performed after the synchronizing step.

It is noted that transmitting the move command to the egress queuing disciplines may cause outbound local and remote network packets to be released from the egress queuing disciplines, and transmitting the move command to the ingress queuing discipline may cause inbound local and remote network packets to be released from the common ingress queuing discipline. Thus, an order is established, in which output processing with the technical device and releasing of outbound network packets occurs first, and input processing with the technical device and releasing of inbound network packets occurs afterwards. This structure further facilitates time-deterministic behavior and establishes variable, but well-defined points in time at which a reconfiguration can take please, such as before the output processing, between output and input processing, or after the input processing.

According to a further embodiment, the respective queuing discipline is configured to, upon dequeuing a network packet, process the network packet according to a configurable ruleset.

That is, the respective queuing discipline may advantageously implement rules-based processing of the network packets upon their dequeuing from the respective queues. The rules-based processing can be configured and used by the real-time container agent to cause routing and multicasting of the network packets according to a configuration plan of the industrial control system. Herein, advantageously, the rules-based processing can thus occur in a time-deterministic manner at defined points in time within each cycle. Also, the inventors have found that in comparison to using components of the network stack (such as iptables in Linux) to perform rules-based processing, a significant performance gain may be achieved by implementing only the subset of rules-based processing that is required for orchestration of an industrial control system directly in the queuing disciplines. This performance gain is particularly beneficial during a reconfiguration of the industrial control system, i.e., when one or more of the rules need to be changed fast and in a time-deterministic manner.

According to a further embodiment, the configurable ruleset is capable of causing, depending on what is configured, one or more of the following kinds of processing of the network packet: performing network address translation on the network packet; cloning the network packet and shortlisting the cloned network packet; immediately releasing the network packet if the network packet is shortlisted; capturing a copy of the network packet for later replay; and dropping the packet if a per-cycle-quota for the packet is depleted in the current cycle.

The proposed cloning and shortlisting functionality may advantageously be used to, upon dequeuing a single network packet, implement multicasting, even if only one network packet can be dequeued at a time.

The proposed capturing functionality may advantageously be used to patch temporarily broken data paths, e.g., when a transmitting control application needs to be blocked due to a state transfer operation as part of a reconfiguration, and the receiving control application could work with a replicated input from the transmitting control application meanwhile. In this way, an industrial control system's functionality may be kept up with limited degradation during such state transfers.

According to a further embodiment, the real-time container agent is configured to, during the maintenance processing, implement a communication mapping of the industrial control system pertaining to the industrial control device by configuring corresponding rules in the configurable ruleset of the respective queuing disciplines.

That is, the proposed network address translation functionality of the queuing discipline may advantageously be used for orchestration, that is, for the rewriting of destination addresses, ports and the like of the in-transit network packets, according to a configuration plan that specifies the communication mapping of the industrial control system.

Herein, advantageously, the rule-based rewriting of the in-transit network packets for orchestration purposes happens upon dequeuing network packets from the respective queuing disciplines. Since the real-timer container agent uses the move commands to control the barrier timestamps that in turn control which network packets can be dequeued and which can't, it is possible to control precisely which network packets will be affected by changed rules upon configuration and which won't. Thus, a time-deterministic behavior in the case of reconfigurations can be further facilitated.

Herein, "a communication mapping of the industrial control system pertaining to the industrial control device", in particular, may refer to any portion of the communication mapping that requires a reconfiguration of the ruleset of at least one of the queuing disciplines of the industrial control device.

According to a further element, a matching clause configurable for each configurable rule of the configurable ruleset comprises at least one criterion to be matched against a package header of the network packet and at least one criterion to be matched against a timestamp of the network packet.

Thus, using the criterion that is matched against the timestamp of the network packet, it is advantageously possible to define network processing rules that only apply to network packets that not only match the criterion that is to be matched against the package header, but also only apply to network packets that were enqueued in a certain cycle, or that were enqueued not earlier than a certain cycle, or that were enqueued not later than a certain cycle. In other words, for example, it is possible to configure a rule that will expire after a certain cycle, or to configure a rule that will only be enforced at a logical time point in the future.

Thus, it is advantageously possible to perform a reconfiguration such that each network packet is treated correctly according to the cycle in which it was enqueued. Thereby, the time-deterministic behavior during reconfiguration can be further facilitated.

According to a further embodiment, the real-time container agent is configured to implement the communication mapping by configuring the configurable rulesets of the respective queuing disciplines at one or more of the following points in time: before the input processing; between the output processing and the input processing; after the input processing.

In other words, in a configuration plan that is to be transmitted to the real-time container for implementing a reconfigured communication mapping, it can be specified whether the reconfiguration (such as the reconfiguring of the configurable ruleset of the queuing disciplines) is to be performed before the output processing, between the output processing and the input processing, or after the input processing.

Thus, it is possible to reconfigure a communication mapping in a quiescent state of the control applications. Yet still, no fixed time slice needs to be reserved for such a reconfiguration. Rather, in different time cycles, and/or in the same cycle, but across different of the industrial control devices, the precise times at which the reconfiguration takes places may vary, because the reconfiguration is not tied to precise times, but rather to logical events, such as prior to commencing or after finishing of the output and/or input processing.

In this way, time-deterministic behavior during reconfiguration can be facilitated further and in an advantageously efficient manner.

Any embodiment of the first aspect may be combined with any embodiment of the first aspect to obtain another embodiment of the first aspect.

According to a second aspect, an industrial control system comprising a plurality of the industrial control devices of the first aspect or any of its embodiments, the physical work interfaces of which are interconnected by a physical network.

The physical network may be an Ethernet, for example. In particular, the physical network may apply quality of service rules that ensure that network packets that are transmitted between the containerized control applications are prioritized over other network traffic, and are delivered within a maximum period of one of the constant cycles.

According to a third aspect, a method of operating an industrial control system is proposed. Herein, the industrial control system comprises a plurality of industrial control devices each configured to execute a number of control applications in constant cycles, each industrial control device comprising: a number of containers each containerizing a respective one of the control applications; a number of network interfaces comprising a physical network interface of the industrial control device and a number of virtual network interfaces of the respective containers; a number of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline;

and a real-time container agent. The method comprises: the real-time container agents of each of the industrial control devices synchronizing a start time of each cycle with each other globally across the industrial control system, after which, in each cycle, each realtime container agent performs maintenance processing and causes execution of each of the control applications for a remainder of the cycle only after having finished the maintenance processing, wherein the maintenance processing comprises: performing, on behalf of the control applications of the respective industrial control device, output processing and input processing with a technical device connected to the respective industrial control device; and transmitting, to each of the queuing disciplines of the respective industrial control device, a move command instructing the respective queuing discipline to advance its barrier timestamp, wherein the move command comprises a timestamp indicating a logical execution time, which is the start time of the respective cycle, and the method further comprises the respective queuing discipline adjusting, in response to receiving the move command, its barrier timestamp based on the logical execution time indicated by the timestamp comprised in the move command.

According to a fourth aspect, a computer program product (non-transitory computer readable storage medium having instructions, which when executed by a processor, perform actions) is proposed that comprises instructions which, when run on an industrial control device having a physical network interface for an industrial control system comprising a plurality of industrial control devices, cause the industrial device to: be configured to execute a number of control applications in constant cycles; form a number of containers each containerizing a respective one of the control applications and each having a virtual network interface, form a number of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline, form a real-time container agent. Herein, the instructions, when run on the industrial control device, further cause the real-time container agent to perform, in each cycle, maintenance processing and execution of each of the control applications for a remainder of the cycle only after having finished the maintenance processing, wherein the maintenance processing comprises: performing, on behalf of the control applications, output processing and input processing with a technical device connected to the industrial control device; and transmitting, to each of the queuing disciplines, a move command instructing the respective queuing discipline to advance its barrier timestamp, wherein the move command comprises timestamp indicating a logical execution time, which is the start time of the respective cycle. The instructions further cause the respective queuing discipline to adjust, in response to receiving the move command, its barrier timestamp based on the logical execution time indicated by the timestamp comprised in the move command.

The computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

More particularly, the computer program product may comprise a plurality of modules, wherein a respective module embodies one of the respective units of the industrial control device, such as the queuing disciplines and the real-time container agent. Merely as an example, the computer program product may comprise an installable Linux qdisc, a Linux executable that implements the real-time container agent, and the like.

The embodiments and features described with reference to the industrial control device of the first aspect apply, mutatis mutandis, to the industrial control system of the second aspect, the method of the third aspect and the computer program product of the fourth aspect.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 10 shows a timing diagram used for illustrating the flow of remote network packets according to the first exemplary embodiment;

FIG. 12 shows a timing diagram used for illustrating the flow of remote network packets according to a comparative example;

In the Figures, like reference numerals designate like or functionally equivalent elements, unless otherwise indicated.

DETAILED DESCRIPTION

General Configuration of Industrial Control System

Figure 1:
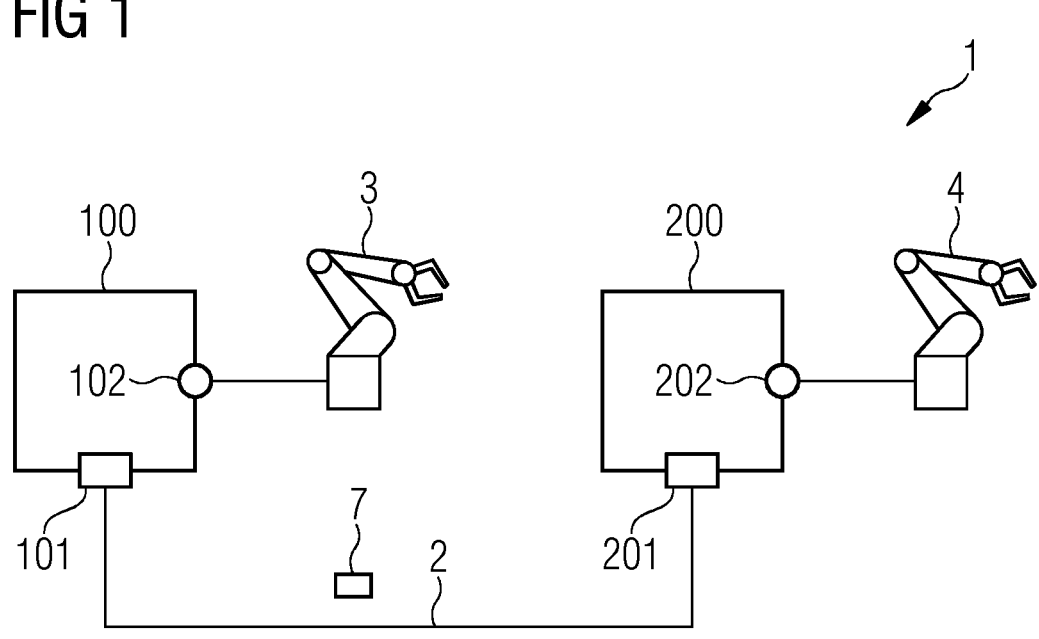
FIG. 1 shows a schematic diagram illustrating a structural configuration of an industrial control system according to a first exemplary embodiment.

FIG. 1 shows a schematic diagram of an industrial control system 1 according to a first exemplary embodiment. The industrial control system 1 comprises industrial control devices 100 and 200. Each of the industrial control devices 100, 200 has a respective physical network interface 101, 201. The physical network interfaces 101, 201 of the industrial control devices 100, 200 are interconnected by a physical network 2. Each industrial control device 100, 200 further comprises a physical input/output, I/O, port 102, 202. A respective technical device 3, 4 is connected to the respective input/output port 102, 202. The industrial control devices perform control of the technical devices 3, 4 by inputting and outputting data to and from the technical devices 3, 4 via the input/output port 102, 202. Processing of the input data and processing of data to be output as the output data is performed by control applications (not shown in FIG. 1) that are being executed in constant cycles on the industrial control devices 100, 200 of the industrial control system. The control applications executing on different of the industrial control devices 100, 200 communicate with each other by exchanging network packets 7 over the physical network 2. The industrial control system 1 is configured such that the physical network 2 is guaranteed to deliver a network packet 7 to its destination within a time period that equals the length of one of the constant cycles. Thus, the industrial control system 1 has real time capabilities.

Merely as one rather simple example, the technical device 3 could be a switch, and the technical device 4 could be a light bulb. When the switch 3 is depressed, the industrial control system 100 reads a value indicating the pressing of the switch 3 as input data via I/O port 102. The industrial control system 100 transmits a network packet 7 including a command to turn on the light bulb 4. The industrial control system 200 receives the network packet 7 and puts out a signal via I/o port 202 that causes the light bulb 4 to turn on. In practice, it goes without saying that the technical devices 3 and 4 will be far more sophisticated devices, such as robots, machinery, and the like, including a plurality of sensors, actors, and the like.

Figure 2:
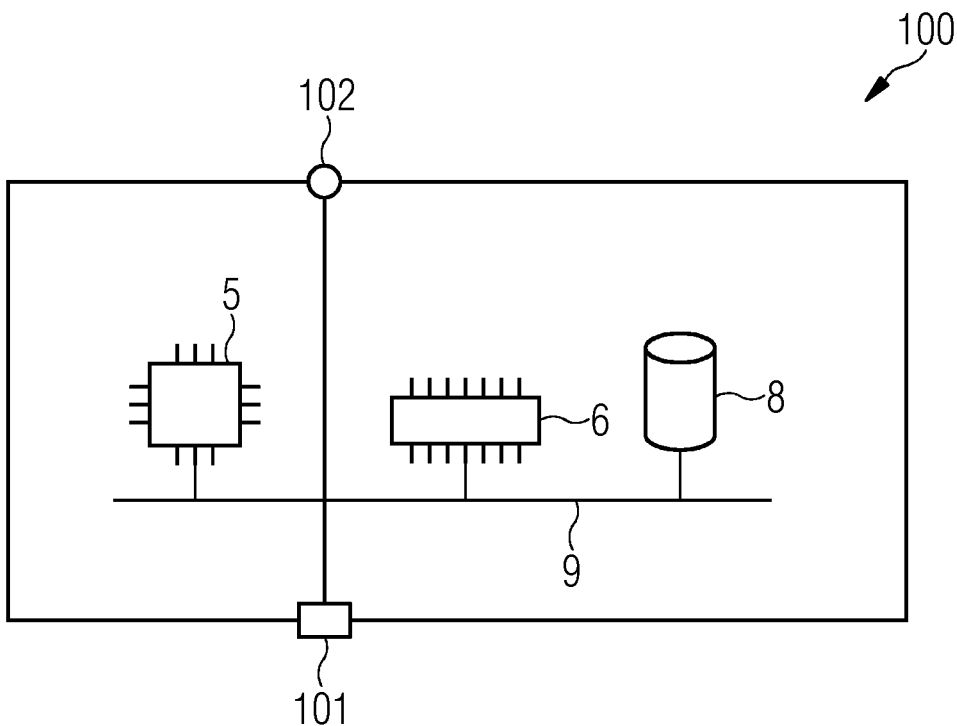
FIG. 2 shows a schematic diagram illustrating a structural configuration of an industrial control device according to the first exemplary embodiment.

FIG. 2 shows a schematic diagram illustrating a structural configuration of the industrial control device 100 according to the first exemplary embodiment. The industrial control device 100 is a computing device that includes a processor 5, a memory 6 and a storage 8. The industrial control device 100 further includes the I/O port 102 and the physical network interface 101. The processor 5, the memory 6, the storage 8, the physical network interface 101 and the I/O ports 102 are interconnected by at least one bus 9.

A computer program product may be stored in the storage 8. The computer program product is loaded from the storage 8 into the memory 8 and is executed by the processor 6. When the computer program product is executed in this way, the industrial control device 100 forms various units having a functional configuration that is shown in FIG. 3.

For example, the industrial control device 100 may be a Simatic® IOT2040 controller or the like.

Figure 3:
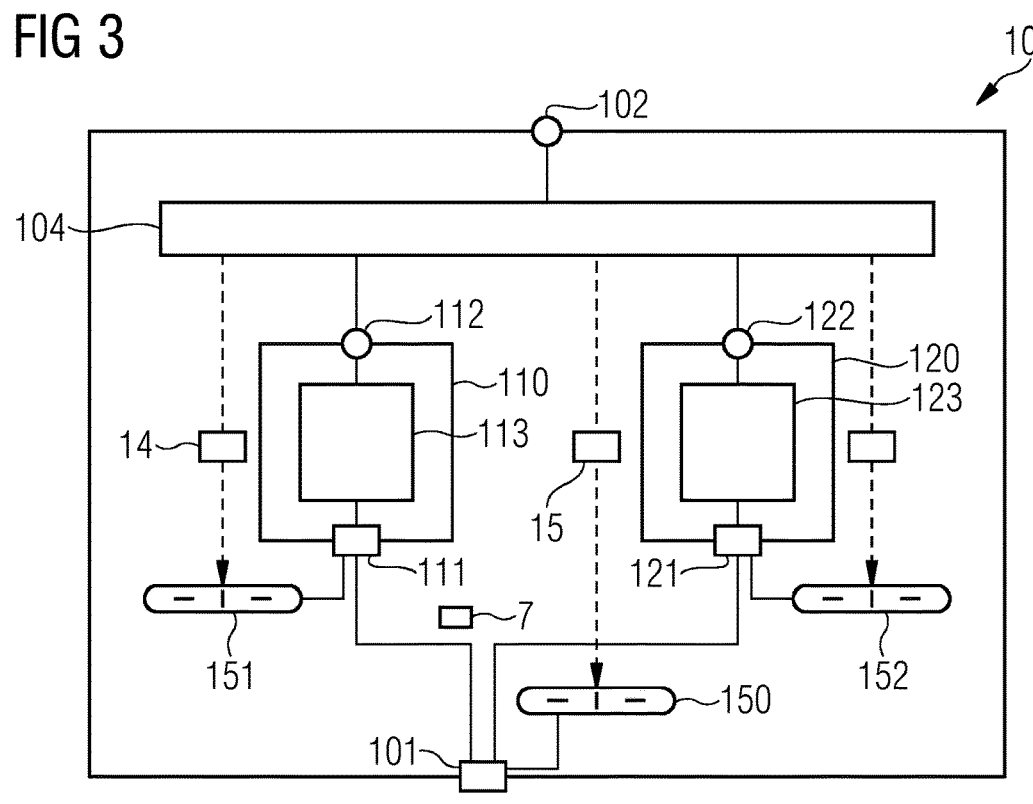
FIG. 3 shows a schematic diagram illustrating a functional configuration of the industrial control device according to the first exemplary embodiment.

FIG. 3 shows a schematic diagram illustrating a functional configuration of the industrial control device 100 of the first exemplary embodiment. The industrial control device 100 executes two control application 113 and 123. The respective control applications 113, 123 are containerized inside respective containers 110, 120 that isolate the containerized control applications 113, 123 from each other and from the hardware of the industrial control device 100.

In particular, the containers 110, 120 each form an abstraction layer for the hardware of the industrial control device 100 that comprises, inter alia, a respective virtual I/O port 112, 122 and a respective virtual network interface 111, 121. The containers 110, 120 may be implemented using Linux Containers, lxc, Docker, and the like, for example.

The virtual network interfaces 111, 121 and the physical network interface 101 are interconnected. That is, a network packet 7 that is sent by control application 113 through the virtual network interface 111 can reach the virtual network interface 121 of the other control application 123 and/or the physical network interface 101 for further transmission over the physical network 2 (FIG. 1).

Herein, the forwarding of network packets 7 from one of the network interfaces 111, 121, 101 to another one of the network interfaces 111, 121, 101, and the forwarding of network packets 7 along the physical network 2 (FIG. 1) may be performed using techniques such as a kernel, a TCP/IP stack, device drivers, redirections, virtual bridges and the like of an operating system of the respective control device 100. The forwarding of the network packets within the industrial control device 100 and over the physical network 2 (FIG. 1) are performed in parallel to and in the background to the further processing that will be described hereinbelow. The precise times when a network packet 7 that is queued at the virtual network interfaces 111 for transmission is dequeued, is forwarded, and when it reaches another virtual network interface 112 or the physical network interface 101 are, at least to a certain degree, non-deterministic.

A respective queuing discipline 150, 151, 152 is associated with each of the network interfaces 101, 111, 121. Each queuing discipline is configured to enqueue network packets 7 upon request, to manage the network packets 7 in a queue, and to dequeue the network packets 7 upon request. For example, the queuing disciplines 150, 151, 152 may be embodied as Linux qdiscs.

The queuing disciplines 151 and 152 are egress queuing disciplines that only apply to transmitted or egress network packets 7. When a respective control application 13, 123 transmits a network packet 7, it calls a corresponding API of a network stack of the operating system of the industrial control device 100, such as a TCP/IP API. Internally, the operating system kernel then requests the egress queuing discipline 151 to temporarily enqueue the network packet 7. The queuing discipline 111, 152 enqueues the network packet 7 at a last position of its queue. At a different point in time, when the virtual network interface 111, 121 is ready to actually transmit the network packet 7, a dequeuing request is made to the queuing discipline 151, 152, and the foremost network packet 7 is dequeued from the queueing discipline 111, 152, and is transmitted further.

Similarly, the queuing discipline 151 is an ingress queuing discipline. When an ingress network packet 7 is received by the physical network interface 101, the kernel requests to enqueue the network packet 7 in the ingress queuing discipline 150 at a last position of its queue. Later, when the kernel is ready to receive incoming networks, it requests dequeuing of the foremost network packet 7 from the ingress queuing discipline 150.

It is noted that the ingress network packets 7 that are being enqueued in ingress queuing discipline 151 may be remote ingress network packets 7 that are received by the physical network interface 101 over the physical network (2 in FIG. 1), or may be local ingress network packets 7 which are routed from one of the virtual network adapters 111, 121 to another one of the virtual network adapters 111, 121 via the physical network interface 101.

The functional configuration of the industrial device 100 further comprises a real-time container agent 104. The real-time container agent 104 is configured to create the containers 110, 120, to manage execution of the containers 110, 120 in constant cycles, to perform I/O operations via the physical I/O port 102 on behalf of the containerized control application 113, 123, to manage orchestration, i.e. to properly configure the forwarding, routing, network address translation and multicasting of the network packets 7, and to ensure time-deterministic handling of the network packets 7. The latter aspect will now be described in detail.

Time-Deterministic Delivery of Network Packets

Figure 4:
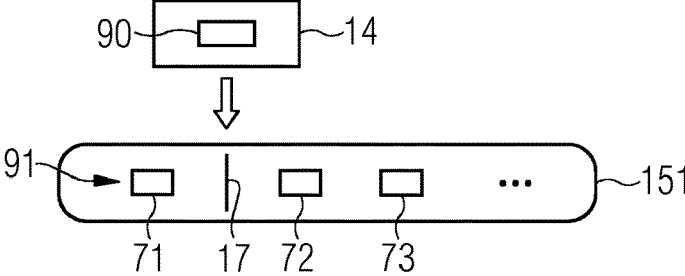
FIG. 4 shows a schematic diagram illustrating a functional configuration of an egress queuing discipline according to the first exemplary embodiment.

FIG. 4 shows a schematic diagram illustrating a functional configuration of an egress queuing discipline 151 according to the first exemplary embodiment. Reference will be made to FIGS. 3 and 4.

The egress queuing discipline 151 manages network packets 71-73 in a queue 91. Reference signs 71-73 are used to make specific reference to specific ones of the network packets 7 in a state while they are enqueued in the queue 91. Upon enqueuing a network packet 71-73, a timestamp is associated with the freshly enqueued network packet 71-73, the timestamp being set to a current time at the moment of enqueuing the corresponding network packet 71-73 in the queue 91. In FIG. 4, the queue 91 is shown with the network packets 71-73 being arranged in chronological order based on their timestamps, with timestamps progressing from old to new from left to right, however this is not a requirement. Furthermore, the egress queuing discipline 151 maintains a barrier timestamp 17. When a dequeuing request is received, the egress queuing discipline 151 checks whether any of the network packets 71 held in the queue 91 has a timestamp that is older than its barrier timestamp 17. If yes, the network packet 71 with the oldest timestamp is dequeued in response to the dequeuing request. If no, then no packet is dequeued, i.e., the network packets 72-73 having a timestamp newer than the barrier timestamp 17 are held back in the queue 91.

The barrier timestamp 17 of the egress queuing discipline 151 is managed by the realtime container agent 104. In particular, when the egress queuing discipline 151 receives a move command 14 from the real-time container agent 104, the egress queuing discipline 151 moves the barrier timestamp 17. According to the present exemplary embodiment, the move command 14 contains an indication 90 of a logical execution time, which is a start time of a current execution cycle. Accordingly, the egress queuing discipline 151 moves the barrier timestamp 17 rightwards to the logical execution time indicated by indication 90. If any of the network packets 72, 73 that previously were held back are now older than the moved barrier timestamp 17 (are now on the left side of the barrier timestamp 17 in FIG. 4), they will no longer be held back and can be dequeued when a next dequeuing request is received.

Herein, functionality of the egress queuing discipline 151 has been described in detail as an example. It is understood that the egress queuing discipline 152 comprises similar functionality.

Figure 5:
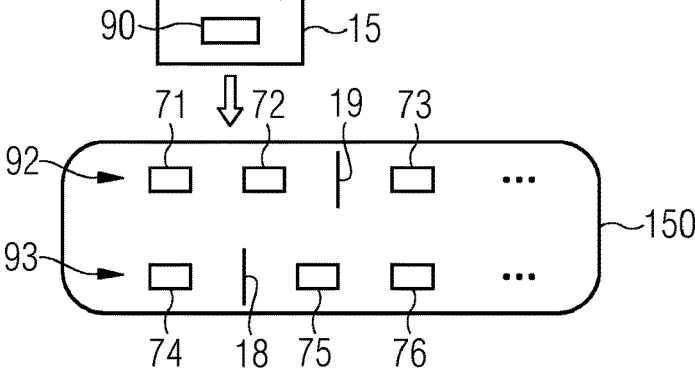
FIG. 5 shows a schematic diagram illustrating a functional configuration of an ingress queuing discipline according to the first exemplary embodiment.

FIG. 5 shows a schematic diagram illustrating a functional configuration of an ingress queuing discipline 150 according to the first exemplary embodiment. Reference will be made to FIGS. 3 and 5.

The ingress queuing discipline 150 manages two queues 92, 93 of network packets 71-76. Reference signs 71-76 are used to make specific reference to specific ones of the network packets 7 in a state while they are enqueued in one of the queues 92, 93. Upon enqueuing a network packet 71-76, the ingress queuing discipline 150 associates a timestamp indicating the current time with the network packet 71-76. Furthermore, upon enqueuing each of the network packets 71-76, the ingress queuing discipline 150 decides whether the respective network packet 71-76 is a local network packet 71-73, which has been transmitted from one of the containers 110, 120 on the industrial control device 100 to one of the other containers 110, 120 on the same industrial control device 100 via the physical network interface 101. If the network packet 71-76 is a local network packet 71-73, the packet is enqueued in the first queue 92. Otherwise, the network packet 74-76 is a remote network packet 73-76 that has been received via the physical network interface 101. The remote network packets 73-76 are enqueued in the second queue 93. Both the first queue 92 and the second queue 93 are kept in an ordered state of ascending timestamps from left to right. Furthermore, the ingress queuing discipline 150 maintains two barrier timestamps 18 and 19. The barrier timestamp 19 is used for the local network packets 71-73 in the first queue 92, and the barrier timestamp 18 is used for the remote network packets 74-76 in the second queue 93. When a dequeuing request is received, the ingress queuing discipline 150 checks whether queue 92 has network packets 71 that are older than the barrier timestamp 18 of the first queue 92 and whether the second queue 93 has network packets 74 that are older than the barrier timestamp 19 of the second queue 93. If there is any such network packet 71, 74, the network packet 71, 74, 75 with the oldest timestamp is dequeued in response to the dequeuing request. If no, then no packet is dequeued, i.e. the network packets 73, 75, 76 having timestamps newer than the respective barrier timestamp 18, 19 are held back in the respective queue 92, 93. By having two separate queues 92, 93 that are maintained sorted by timestamp, the ingress queuing discipline 150 can advantageously handle different barrier timestamps 19, 18 for the local packet queue 92 and the remote packet queue 93 in an efficient manner: Upon receiving a dequeuing request, only the oldest (leftmost) network packet 71, 74 in each of the queues 92, 93 needs to be checked against the corresponding barrier timestamp 18, 19.

Thus, when the ingress queuing discipline 150 receives a move command 15 from the real-time container agent 102, the ingress queuing discipline 150 moves the barrier timestamps 18 and 19. The move command 15 contains the indication 90 of the logical execution time. According to the present exemplary embodiment, the ingress queuing discipline 150 moves the barrier timestamp 19 of the local packet queue 92 to a time that equals the logical execution time indicated by the indication 90 plus the length of one cycle of the constant cycles. In other words, the barrier timestamp 19 of the local packet queue 92 is moved to the end time of the current cycle. Furthermore, the ingress queuing discipline 150 moves the barrier timestamp 18 of the remote packet queue 93 to the logical executing time indicated by indication 90, i.e., to the start time of the current cycle. Afterwards, if any of the network packets 73, 75, 76 that previously were held back are now older than the respective moved barrier timestamp 18, 18 of their respective queue 92, 93, they will no longer be held back and can be dequeued when a next dequeuing request is received.

Advantages of the above-disclosed interaction between the real-time container agent 104 and the queuing disciplines 150, 151 and 152 will become more apparent from a description of the flow of local network packets 71-73 that will now be given with reference to FIG. 6.

Figure 6:
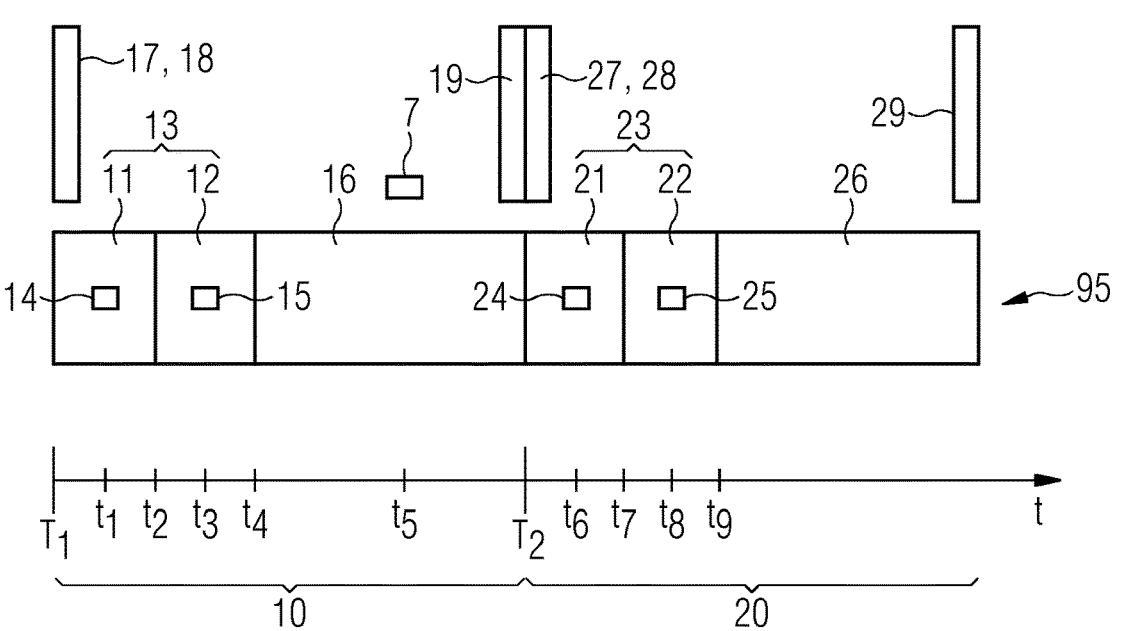
FIG. 6 shows a timing diagram used for illustrating the flow of local network packets according to the first exemplary embodiment.
Figure 7:
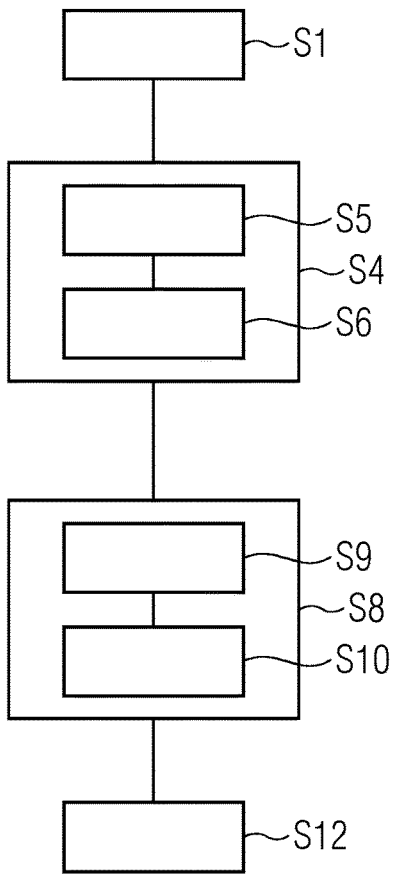
FIG. 7 shows method steps of a method of operating the industrial control device according to the first exemplary embodiment.

FIG. 6 shows a timing diagram used for illustrating the flow of local network packets 71-73 during two cycles 10, 20 according to the first exemplary embodiment. FIG. 7 shows method steps of a method of operating the industrial control device 100 according to the first exemplary embodiment.

Reference is made to FIG. 3 to 7. In FIG. 6, processing phases 13, 16, 23, 26 of the real-time container agent 104 are schematically visualized with band 95. In each of the constant cycles, the real-time container agent 104 performs the following steps/runs through the following processing phases:

In step S1, the real-time container agent 104 initializes and determines the start time T1 of the current cycle, i.e., the logical execution time. After initializing, the real-time container agent 104 proceeds with the maintenance processing 13. Therein, in step S4, the real-time container agent 104 performs output processing 11. During the output processing 11, the real-time container agent 104 reads output data written by the control applications 110, 120 during a previous cycle from the virtual I/O ports 112, 122 and outputs the output data through the physical I/O port 102 to the technical device (3 in FIG. 1). It is noted that the virtual I/O ports 112, 122 may be, for example, implemented as a virtual Linux GPIO file system. Thus, the real-time container agent 104 performs output processing 11 on behalf of the containerized control applications 113, 123. Also, at some time t1 during the output processing 11, the real-time container agent 104 transmits, step S5, the move command 14 to the egress queuing disciplines 151 and 152. In response to receiving the move command 14, the egress queuing disciplines 151, 152 adjust, step S6, their barrier timestamps 17 to the logical execution time T1, and will, upon receiving subsequent dequeuing requests, dequeue any network packets 71 enqueued therein that are now older than the moved barrier timestamp 17.

When the output processing 11 is finished, the real-time container agent 104, in step S8, starts to perform input processing 12 at time t2. During input processing 12, the realtime container agent 104 reads input data through the physical I/O port 102 from the technical device (3 in FIG. 1) and writes the read input data to the virtual I/O ports 112, 122 of the containers 110, 120. Thus, the real-time container agent 104 performs input processing 12 on behalf of the containerized control applications 113, 123. Also, at some time t3 during the input processing 12, the real-time container agent 104 transmits, step S9, a move command 15 to the ingress queuing discipline 150. In response to receiving the move command 15, the ingress queuing discipline 150 adjusts, step S10, the barrier timestamp 19 of its local queue

92 to the end time T2 of the first cycle 10, and adjusts, step S10, the barrier timestamp 18 of its remote queue 93 to the start time of the first cycle 10. Thereby, any local network packets 71, 72 that are now older than the adjusted local barrier timestamp 19 and any remote network packets 74 that are now older than the adjusted remote barrier timestamp 18 are now ready to be dequeued upon subsequent dequeuing requests.

That is, at the point in time t4 when the maintenance processing 13 is finished, the barrier timestamp 17 of the egress queuing disciplines 151, 152, the barrier timestamp 18 of the remote queue 93 of the ingress queuing discipline 150 and the barrier timestamp 19 of the local queue 92 of the ingress queuing discipline 150 are now set up as shown in FIG. 6 for the first cycle 10.

Then, in step S12, after the maintenance processing 13 is finished at time t4, the real-time container agent 103 causes execution 16 of each of the control applications 113, 213 for the remaining time in the first cycle 10, i.e., from time t4 until time T2. The real-time container agent 103 terminates and/or suspends the control applications 113, 213 right in time prior to time T2. Thus, the first cycle 10 finishes.

Then, the second cycle 20 starts. The processing described above for the first cycle 10 is repeated for the second cycle 20. In particular, the maintenance processing 23 of the second cycle 20 comprises input processing 21 including transmitting move command 24 and output processing 22 including transmitting move command 25. When the maintenance processing 23, ends at time t9, the barrier timestamps 27, 28, 29 of the respective queuing disciplines 150, 151, 152 are set up as shown in FIG. 6 for the second cycle 20.

Now, the flow of a network packet 7 is examined in detail. Network packet 7 as shown in FIG. 6 is a network packet that is created by control application 113 during its execution in the processing phase 16 of the first cycle 10 at time t5. Also, network packet 7 as shown in FIG. 6 is a local network packet that is to be delivered to the other control application 123 that executes on the same industrial control device 100 (FIG. 1, 2).

At time t5, the network packet 7 is enqueued into the egress queuing discipline 151 associated with the first virtual network interface 111 and is associated with timestamp t5. At time t5, the barrier timestamp 17 of the egress queuing discipline 151 is set at the logical execution time T1 of the first cycle 10. Thus, the timestamp t5 of the network packet 7 is newer than the barrier timestamp 17 of the egress queuing discipline 151. Therefore, the network packet 7 is being held back in the queue 91 of the egress queuing discipline 151 at least for the remainder of the first cycle 10.

Then, at time t6 during the second cycle 20, the move command 24 is issued to the first egress queuing discipline 151, and the first egress queuing discipline 151 adjusts its barrier timestamp, which now is barrier timestamp 27 at time T2>t5. Thus, a certain amount of time after the move command 24 is issued at time t6, the network packet 7 will be dequeued from the first egress queuing discipline 151. After that, the network stack of the operating system of the industrial control device 100 (FIG. 1, 2) processes and forwards the network packet 7. In the present exemplary embodiment, local network packets 7 are routed via an internal side of the physical network interface 101. Thus, the local network packet 7 will be enqueued in the common ingress queuing discipline 150 and be associated with a new timestamp tx>t6. Herein, it is noted, that at time t6, the barrier timestamp 19 of the local queue 92 of the ingress queuing discipline 150 is still set to T2. Since T2<t6<tx, the network packet 7 will potentially be held back. However, at time t8, the move command 25 is transmitted to the ingress queuing discipline 150, in response to which the local queue 92 of the ingress queuing discipline 150 adjusts its barrier timestamp to become the barrier timestamp 29, which is set at the end of the second cycle 20 at time T3. Since it can safely be assumed that T3>tx, the network packet 7 having a timestamp of tx<T3 will now be released for dequeuing, even if it has been held back initially.

In particular, it is noted that the precise time tx at which the network packet 7 is enqueued in the local queue 92 of the ingress queuing discipline 150 is unknown; it could be that tx>t8; in this case the network packet 7 will not be held back at all; or it could be that tx<t8, in this case the network packet 7 will be held back at first but will be released soon after t8. In either case, the local network packet 7 will be released for dequeuing well within the second cycle 20. After dequeuing, the local network packet 7 will be sent to the local network interface 121 and will reach the control application 123 during its execution in processing stage 26 of the second cycle 20.

Figure 8:
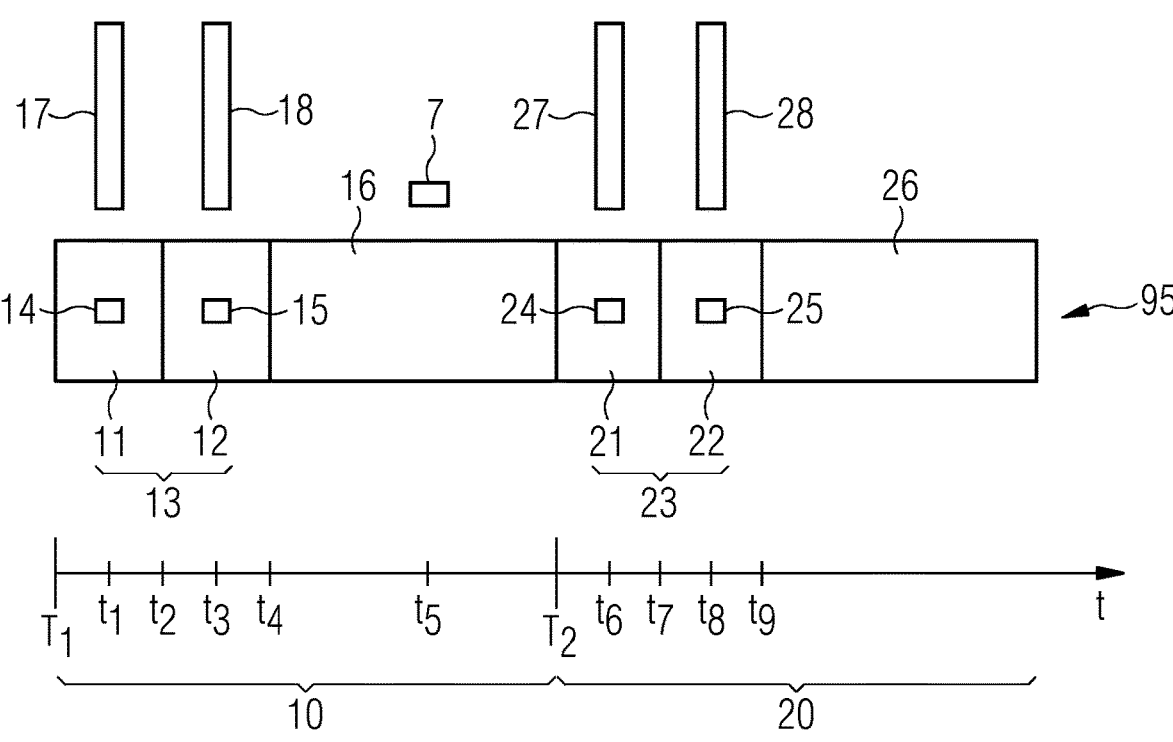
FIG. 8 shows a timing diagram used for illustrating the flow of local network packets according to a comparative example.

FIG. 8 shows a timing diagram used for illustrating the flow of local network packets 7 according to a comparative example. Reference is made to FIG. 8 and FIG. 3-5.

In the comparative example, the move commands 14, 15 do not comprise an indication 90 of the logical execution time T1. Also, the ingress queuing discipline 150 only comprises a single queue 93 used for both remote and local network packets 7, and maintains a single barrier timestamp 18. At the respective time points when the move commands 14 and 15 are being received, the respective queuing disciplines 150, 151 and 152 set their barrier timestamps 17, 18 to the current time at which the respective move command 14, 15 is received.

Accordingly, during the execution phase 16 of the first cycle 10, the barrier timestamp s17 of the egress queuing disciplines 151, 152 are set to time t1, and the barrier timestamp 18 of the ingress queuing discipline 150 is set to time t2, as shown in FIG. 8. Accordingly, when the network packet 7 is created and enqueued in the egress queuing discipline 151 at time t5, is its being held back in the egress queuing discipline 151 similar to the case shown in FIG. 6 for the first exemplary embodiment. However, in the second cycle 20, treatment of the network packet 7 differs from the first exemplary embodiment. That is, in the second cycle 20, at time t6, the barrier timestamp 27 of the egress queuing discipline 151 is moved to time t6>t5, and the network packet 7 is released from the egress queue 151. Some non-deterministic time after t6 the network packet 7 is enqueued in the ingress queuing discipline 150 and is associated with time tx>t6.

In the comparative example, at time t8, the barrier timestamp 28 of the ingress queuing discipline 150 is moved to time t8. Usually, the condition tx<t8 holds, because local forwarding of the local network packet 7 is usually very quick. In this case, network packet 7 will be released for dequeuing from the ingress queuing discipline 150 shortly after time t8. However, a race condition exists in that in case of a high load on the industrial control device 100 or the like, the local network packet 7 might only be enqueued in the ingress queuing discipline 150 at a time tx which is also greater than t8. Now, if the local network packet 7 is enqueued with a timestamp tx>t8, the local network packet 7 will be held back in the ingress queuing discipline 150 during the entire remainder of the cycle 20, and will only be released for dequeuing at a future point in time during a non-shown third cycle.

That is, in the comparative example, the network packet 7 could either be released and be received by the processing carried out in the processing phase 26 of the second cycle 20, or could, in cases of high load, only be released and be received by the control application 123 in a processing phase of a third cycle. The comparative example, therefore, cannot guarantee time-deterministic delivery of local network packets 7.

In contrast, thanks to the proposed logical execution time paradigm, in which the move commands 14, 15 comprise an indication 90 of the respective logical execution time T1, T2, and the queuing disciplines 150, 151, 152 adjust their barrier timestamps 17, 18, 19 based on the logical execution time T1, T2, and in which, in particular, the ingress queuing discipline 150 manages a separate queue 92 for local networks, the barrier timestamp 19 of which is set to an end 29 of the cycle 20, it is possible to advantageously ensure that local network packets 7 are always received exactly one cycle after the cycle in which they have been transmitted, without any race conditions and in a time-deterministic manner.

Next, a flow of remote network packets according to the first exemplary embodiment will be illustrated.

Figure 9:
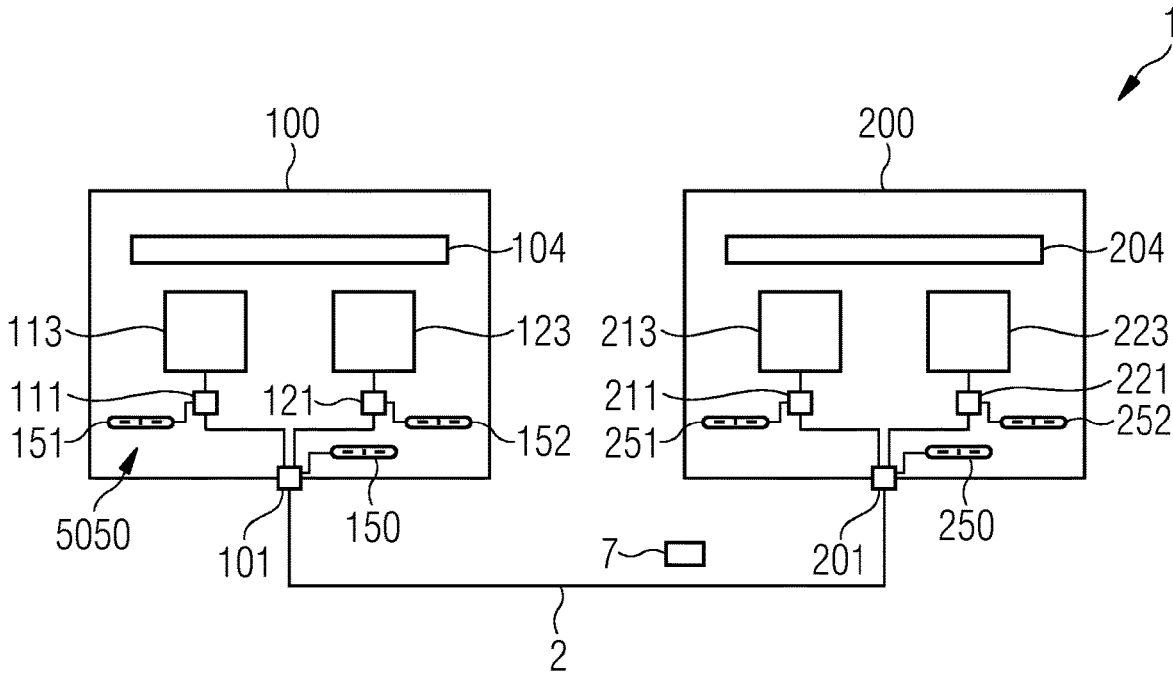
FIG. 9 shows a schematic diagram illustrating an exemplary functional configuration of the industrial control system according to the first exemplary embodiment.
Figure 10:
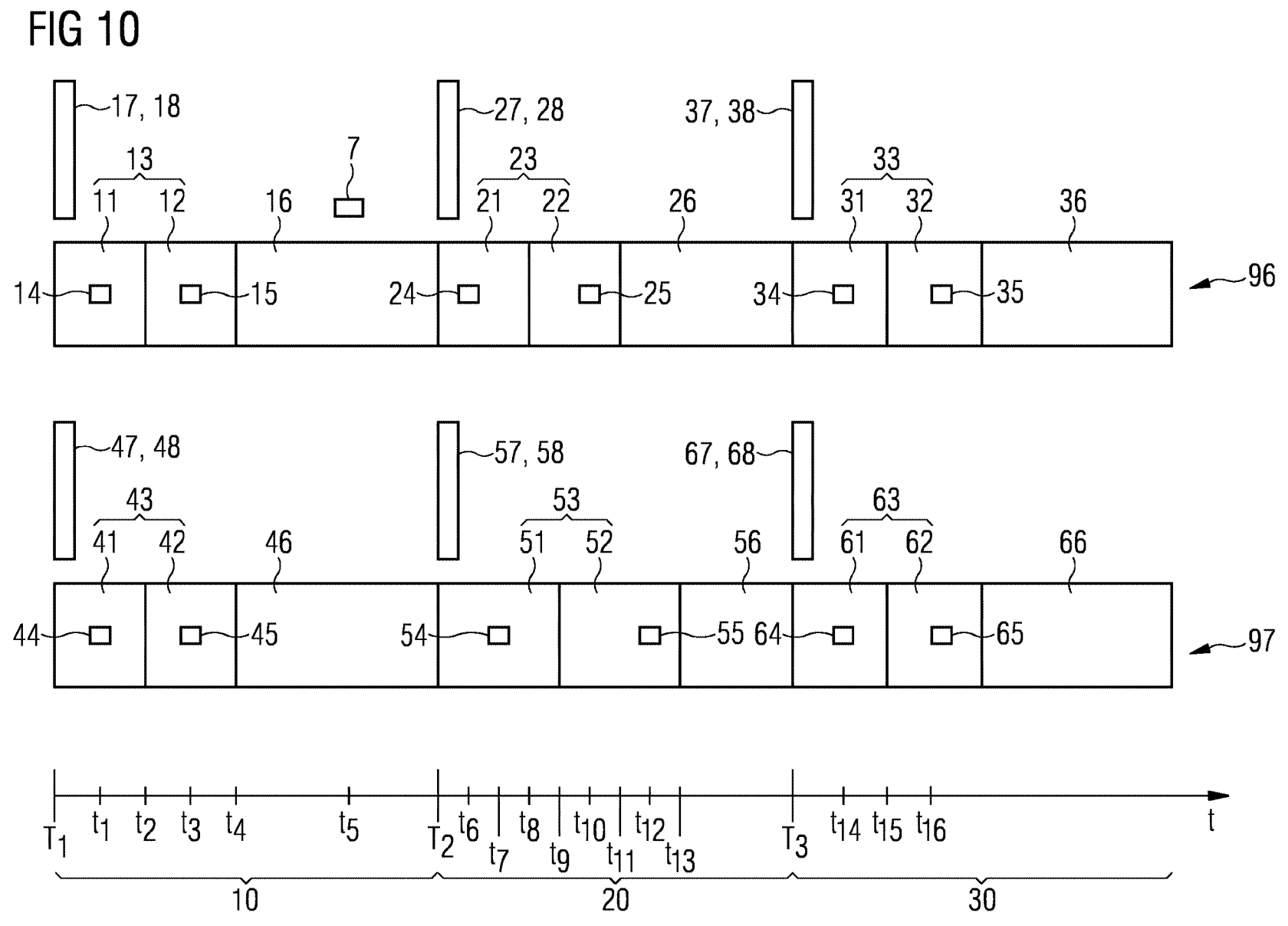
Figure 11:
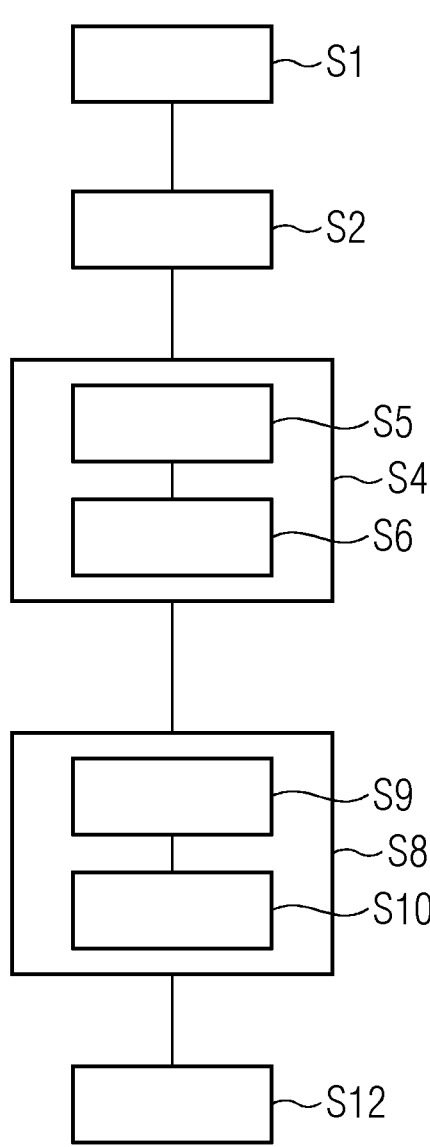
FIG. 11 shows method steps of a method of operating the industrial control system according to the first exemplary embodiment.

FIG. 9 shows a schematic diagram illustrating an exemplary functional configuration of the industrial control system 1. FIG. 10 shows a timing diagram used for illustrating the flow of remote network packets 7 according to the first exemplary embodiment, and FIG. 11 shows method steps of a method of operating the industrial control system according to the first exemplary embodiment. Reference is made to FIG. 9 to 11.

The industrial control system 1 comprises the industrial control devices 100, 200. The industrial control device 100 is the same industrial control device 200 that is shown in FIG. 10 and has been discussed hereinabove; some elements of it are omitted in FIG. 9. That is, as described hereinabove, the industrial control device 100 comprises two containerized control applications 113, 123, each having access to a virtual network interface 111, 121, a physical network interface 101 interconnected with the virtual network interfaces 111, 121, two egress queuing disciplines 151, 152 associated with the respective virtual network interfaces 111, 121, an ingress queuing discipline 150 associated with the physical network interface 101, and a real-time container agent 104. Likewise, the industrial control device 200 comprises two containerized control applications 213, 223, each having access to a virtual network interface 211, 221, a physical network interface 201 interconnected with the virtual network interfaces 211, 221, two egress queuing disciplines 251, 252 associated with the respective virtual network interfaces 211, 221, an ingress queuing discipline 250 associated with the physical network interface 201, and a real-time container agent 204. It is noted that in a case where all of the queuing disciplines, or an arbitrary one of queuing disciplines 150, 151, 152, 250, 251, 252 is referenced, collective reference sign 5050 may be used.

The flow of a remote network packet 7 that is exchanged between the industrial control devices 100, 200 will now be described with reference to FIG. 9 to 11.

In FIG. 10, processing phases 13, 16, 23, 26, 33, 36 of the real-time container agent 104 of the first industrial control device 100 are schematically visualized with the band 96. Processing phases 42, 46, 53, 56 of the real-time container agent 204 of the second industrial control device 200 are schematically visualized with the band 97.

The maintenance processing 13, 23, 33 of the real-time container agent 104 and the control application executions 16, 26, 36 that are performed on the first industrial control device 100 during the respective cycles 10, 20 30; and the maintenance processing 43, 53, 63 of the real-time container agent 204 and the control application executions 46, 56, 66 that are performed on the second industrial control device 200 during the same respective cycles 10, 20 30 are similar to the maintenance processing 13, 23 and the control program executions 16, 26 as described hereinabove with regards to FIG. 6 and will not be described in detail again.

Likewise, the method of operating the industrial controls system illustrated in FIG. 11 is similar to the method of operating the industrial control device illustrated in FIG. 7 and comprises each of the industrial control devices 100, 200 performing, in each of the cycles 10, 20, 30, the steps S1, S4, S5, S6, S8, S9, S10, S12 that were described hereinabove with regards to FIG. 7 and will not be described in detail again.

Attention is drawn, however, to the fact that the method illustrated in FIG. 11 also comprises a further step S2 that is performed collectively by the real-time container agents 104, 204 right after the initializing step S1. Step S2 comprises synchronizing the start times T1, T2, T3 of each cycle 10, 20, 30 among the real-time container agents 104, 204 of the industrial control devices 100, 200 of the industrial control system 1. In other words, the cycles 10, 20, 30 in the industrial control system 1 are isochronous, and the logical execution times T1, T2, T3, i.e., the start times of each of the cycles 10, 20, 30, are the same on each of the industrial control devices 100, 200.

However, no fixed time slices are reserved for the maintenance processing 13, 23, 33, 43, 53, 63 and the control app execution 16, 26, 36, 46, 56, 66. For example, in the second cycle 20, as shown in FIG. 10, the maintenance processing 53 performed by the realtime container agent 204 of the second industrial control device 200 (hereinafter also: "second real-time container agent 204") takes more time than the maintenance processing 23 performed by the real-time container agent 104 of the first industrial control device 100 (hereinafter also: "first real-time container agent 104") in the second cycle 20. Consequently, the first real-time container agent 104 and the second real-time container agent 204 may issue the respective move commands 24, 25, 44, 45 at different points in time t6, t7; t10; t12. By not fixing time slices for the maintenance processing 13, 23, 33, the available time for control program execution 16, 26, 36, 46, 56, 66 is maximized in each cycle 10, 20, 30 on each of the industrial control devices 100, 200. However, certain issues with timing and race conditions can potentially occur, which will now be discussed in detail.

More particularly, in the following, the flow of a remote network packet 7 will be examined in detail. Network packet 7 as shown in FIG. 10 is a network packet that is created by the first control application 113 during its execution in the processing phase 16 of the first cycle 10 on the first control device 100 at time t5. Also, network packet 7 as shown in FIG. 11 is a remote network packet that is to be delivered to the third control application 213 that executes on the other industrial control device 200.

On the first industrial control device 100 (band 96 in FIG. 10), at time t5, the network packet 7 is enqueued into the egress queuing discipline 151 associated with the first virtual network interface 111 and receives t5 as its associated timestamp. At time t5, the barrier timestamp 17 of egress queuing discipline 151 is at the logical execution time T1, i.e., the timestamp t5 of network packet 7 is newer than the barrier timestamp 17. Therefore, packet 7 is being held back in the egress queuing discipline 151 for at least the remainder of the first cycle 10.

Then, still on the first industrial control device 100, at time t6 during the second cycle 20, the move command 24 is issued to the first egress queuing discipline 151, and the first egress queuing discipline 151 adjusts its barrier timestamp to become barrier timestamp 27 set at the new logical execution time T2. Time T2 is newer than time t5. Therefore, some time after the move command 24 is issued at time t6, the network packet 7 will be dequeued from the first egress queuing discipline 151.

After that, the kernel, network stack and the like of the operating systems of the industrial control devices 100, 200 operating in the background will take care of the network packet 7 and will route it through the physical network interface 101 and over the physical network 2 until it reaches the physical network interface 201 of the second industrial control device 200. There, the remote network packet 7 will be enqueued in the ingress queuing discipline 250 associated with the physical network interface 201 of the second industrial control device 200 at a time tx. That is, the remote network packet 7 in the ingress queuing discipline 250 is associated with timestamp tx. Due to a latency of the physical network 2, the routing of the network packet 7 takes some time, and time tx will be considerably later than time t5. However, it is not possible to say when exactly time tx will be. The only guarantee that is made to ensure real-time capabilities is that time tx will be lesser than the end time T3 of the second cycle 20, i.e., tx<T3. Thus, what is known is that T2<t5<tx<T3.

At time tx, when the remote network packet 7 is enqueued in the ingress egress queuing discipline 250 on the second industrial control device 200 (band 97 in FIG. 10), the barrier timestamp of the ingress queuing discipline 250 is most probably barrier timestamp 58 set at T2. If the physical network 2 operated extremely fast, the barrier timestamp of the ingress queuing discipline 250 may even still be T1 (barrier timestamp 48). This is the case if tx<t12, i.e., tx is before the time t12 at which the move command 55 is transmitted to the ingress queuing discipline 250, causing the barrier timestamp of the ingress queuing discipline 250 to be moved to become barrier timestamp 58 set at T2.

In either case, though, tx>T2>T1. Therefore, the network packet 7 will be held back in the ingress queuing discipline 250 for at least the remainder of the second cycle 20. Then, in the third cycle 30 in band 97, at time t16, the move command 65 is issued to the ingress queuing discipline 250. In response thereto, the ingress queuing discipline 250 adjusts its barrier timestamp to become barrier timestamp 68 set at time T3. Now, the remote network packet 7 is ready for dequeuing from the ingress queuing discipline 250, because tx<T3.

In particular, it has been shown that no matter which latency the physical network 2 currently experiences, and even in the case of unusually long maintenance processing 53 on the second industrial control device 200, as long as tx<T3 can be guaranteed, the local network packet 7 will be delivered for processing in the processing phase 66 of the third control application 213 in the third cycle 30, which is the second cycle after the first cycle 10 in which it has been transmitted. Therefore, time-deterministic delivery of remote network packets 7 is advantageously possible.

Figure 12:
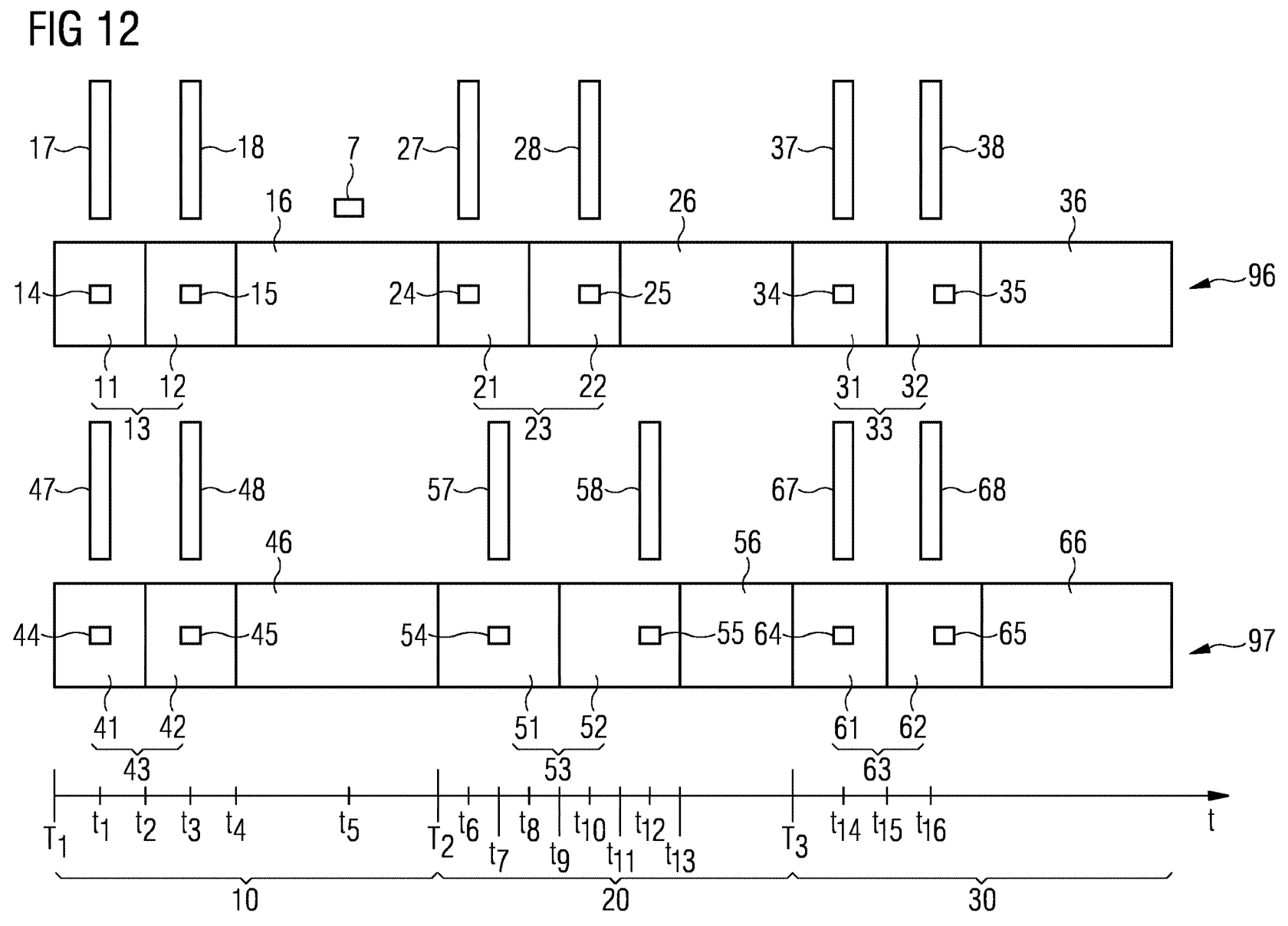

FIG. 12 shows a timing diagram used for illustrating the flow of local network packets 7 according to a comparative example. Reference is made to FIG. 12 and FIG. 9.

In the comparative example, the move commands 14, 15, 24, 25 34, 35, 44, 45, 54, 55, 64, 65 do not comprise an indication 90 (FIGS. 4, 5) of the logical execution time T1. Also, the ingress queuing disciplines 150, 250 each only comprise a single queue 93 (FIG. 5) used for both remote and local network packets, and maintain a single barrier timestamp 18 (FIG. 5). When the move commands 14, 15, 24, 25, 34, 35, 44, 45, 54, 55, 64, 65 are being received, the respective queuing disciplines 5050 set their barrier timestamps 17, 18, 27, 28, 37, 38, 47, 48, 57, 58, 67, 68 to the respective current time at which the respective move commands 14, 15, 24, 25, 34, 35, 44, 45, 54, 55, 64, 65 are received, as shown in FIG. 12.

Accordingly, on the first industrial control device 100, during the execution phase 16 of the first cycle 10 (band 96 in FIG. 12), barrier timestamp 17 of the egress queuing disciplines 151 is set to time t1, as shown in FIG. 12. Accordingly, when the network packet 7 is created and enqueued in the egress queuing discipline 151 at time t5, is its being held back in the egress queuing discipline 151 similar to the case shown in FIG. 12 for the first exemplary embodiment, because t5>t1. However, in the second cycle 20, treatment of the network packet 7 upon reception on the second industrial control device 200 differs from the first exemplary embodiment.

That is, in the second cycle 20, still on the first industrial control device 100 (band 96 in FIG. 12), at time t6, the egress queuing discipline 151 adjusts its barrier timestamp to become barrier timestamp 27 set at time t6>t5. Some time later, the network packet 7 is dequeued from the egress queuing discipline 151, and is forwarded over the physical network 2 until it reaches the second industrial control device 200 (band 97 in FIG. 12) and is enqueued in the ingress queuing discipline 250 and is associated with a timestamp tx>t6.

In the comparative example, at time t12, the ingress queuing discipline 250 adjusts its barrier timestamp to become barrier timestamp 58 set at time t12. Usually, the condition tx>t12 holds, because remote forwarding of the remote network packet 7 is rather slow. In this case, network packet 7 will be held back in the ingress queuing discipline 250 associated with the physical network interface 201 of the second industrial control device 200 for at least the remainder of the second cycle 20, similar to the case described for the first exemplary embodiment above in connection with FIG. 12. Thus, network packet 7 will be ready for dequeuing in the third control cycle 30 after move command 65 causes the ingress queuing discipline 250 to adjust its barrier timestamp to become barrier timestamp 68 at time t16. That is, the network packet 7 will be made available to the control application 213 during its execution phase 66 in the third cycle 30.

However, in a case where the maintenance processing 53 of the second realtime container agent 204 takes a comparatively large amount of time, for example due to a lot of I/O operations being performed, and/or in a case where the physical network 2 operates rather fast, it may happen that the remote network packet 7 is enqueued in the ingress queuing discipline 250 at a time tx that is before the time t12 at which the move command 55 is transmitted to the ingress queuing discipline 250, i.e. tx<t12. In this case, when the network packet 7 is enqueued at time tx, it is initially being held back in the ingress queuing discipline 250, because tx>t3 (barrier timestamp 48). However, when the barrier timestamp of the ingress queuing discipline 250 becomes barrier timestamp 58 due to move command 55 at time t12, the timestamp tx of the remote network packet 7 is now older than the barrier timestamp 58, that is tx<t12. Therefore, the remote network packet 7 will already be ready for dequeuing, and will become dequeued, during the second cycle 20. Consequently, the network packet 7 will reach control application 213 already during its execution phase 56 in the second cycle 20.

Therefore, the comparative example cannot guarantee a time-deterministic behavior, because, as has been shown, remote network packets 7 will be released either one 20 or two cycles 30 after the cycle 10 in which they have been created.

In contrast, according to the first exemplary embodiment, thanks to the proposed logical execution time paradigm, it is possible to advantageously ensure that local network packets 7 are always received exactly two cycles after the cycle in which they have been transmitted, without any race conditions and in a time-deterministic manner.

General Discussion of Orchestration Requirements

Figure 13:
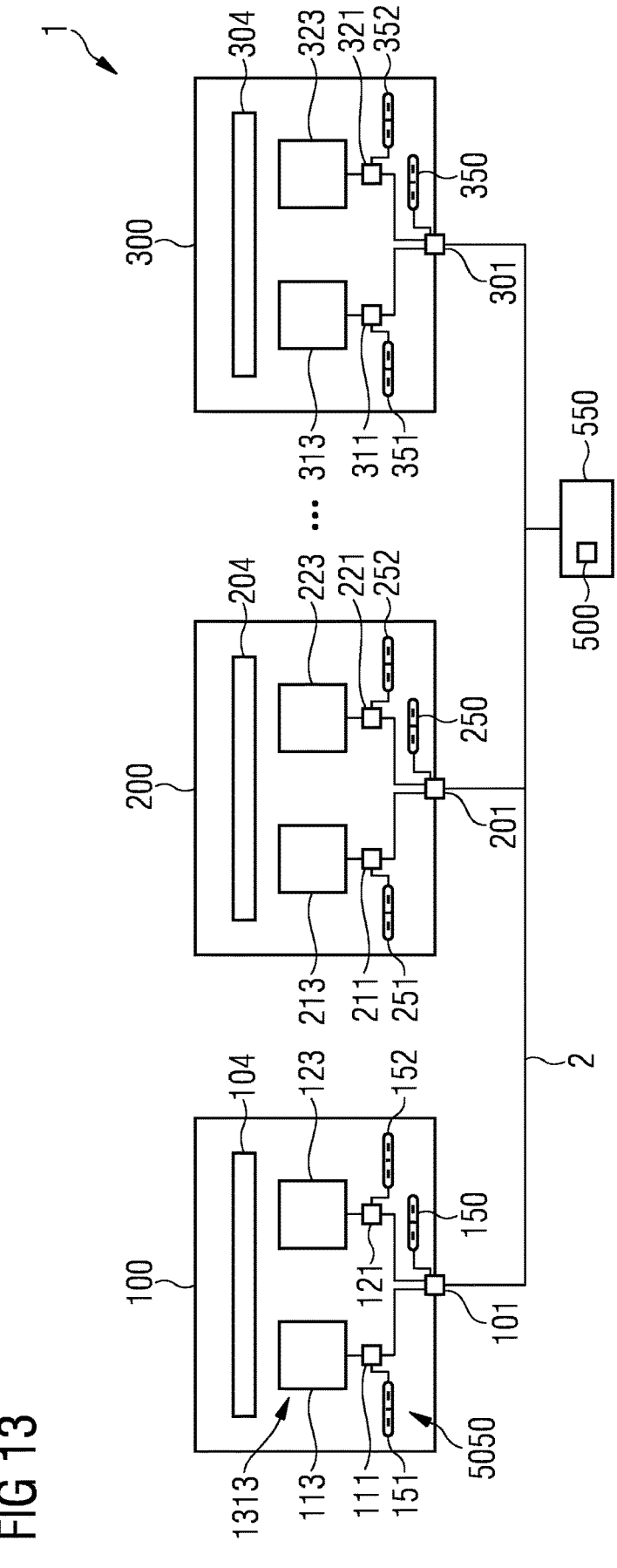
FIG. 13 shows a schematic diagram illustrating a functional configuration of an industrial control system according to a second exemplary embodiment.

FIG. 13 shows a schematic diagram illustrating a functional configuration of an industrial control system 1 according to a second exemplary embodiment. The second exemplary embodiment is based on and is compatible with the first exemplary embodiment. Structural and functional configurations described for the first exemplary embodiment also apply to the second exemplary embodiment and a detailed description thereof is omitted for brevity.

The industrial control system 1 comprises a large number of N industrial control devices. A first industrial control device 100, a second industrial control device 200 and a N-th industrial control device 300 are shown as examples. Each industrial control device 100, 200, 300 executes a number of containerized (containers not shown in FIG. 13, see FIG. 3) industrial control applications 113, 123, 213, 223, 313, 323, which will be referred to collectively using reference sign 1313. Each control application 1313 uses a respective virtual network interface 111, 121, 211, 221, 311, 321 for communication. Each industrial control device 100, 200, 300 has a respective physical network interface 101, 201, 301, and the physical network interfaces 101, 201, 301 are interconnected by a physical network 2 that is used to transmit network packets 7 between the industrial control devices 100, 200, 300.

The containerized control applications 1313, form a distributed embedded control application for controlling a plurality of technical devices (not shown in FIG. 13, see 3, 4 in FIG. 1).

In a "hard-wired" comparative example, each of the control applications 1313 knows which of the other control applications 1313 it is supposed to transmit network packets 7 to. Therefore, the control applications 1313 may directly address all network packets 7 to the IP address, port or the like of specific ones of the control applications 1313. However, any time a reconfiguration of hardware or software is made, such as when a technical device is moved to a different location, or when functions are redistributed inside the distributed embedded control application, or the like, each affected control applications 1313 would need to be updated or reconfigured to reflect the changed or added IP addresses or ports of its communication partners 1313. Let us assume, for example, that control application 113 is a control application performing I/O with a non-shown sensor and produces network packets 7 that contain raw or preprocessed sensor data. It is desired that the code and configuration of the control application 113 should not need to be updated no matter which and how many other ones of the control applications 1313 may want to consume the sensor data produced by the control application 113. Therefore, the second exemplary embodiment has a different approach on how to generate and address network packets 7.

Figures 14, 15:
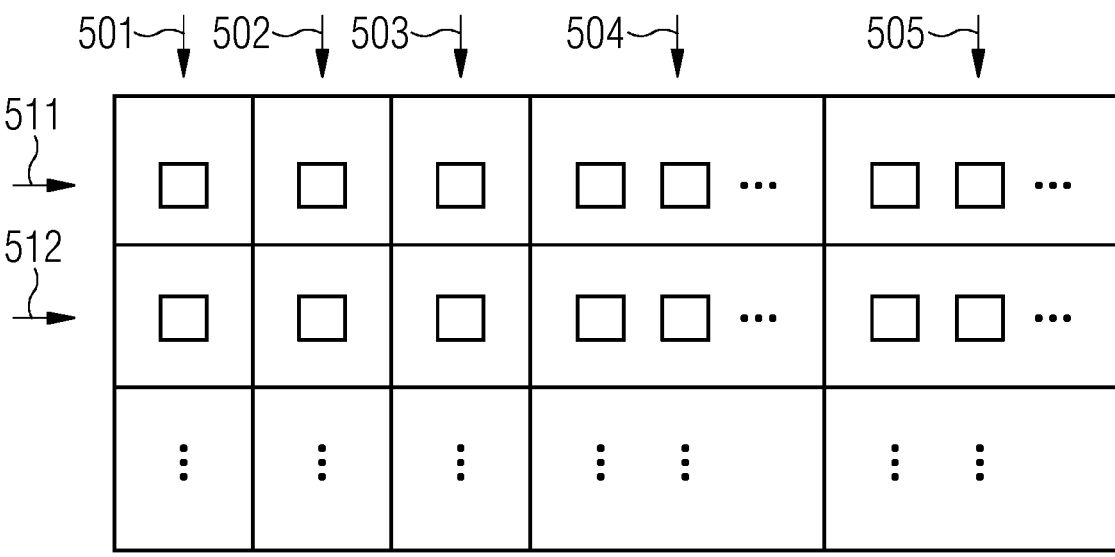
FIG. 14 shows a functional configuration of a network packet according to the second exemplary embodiment.
FIG. 15 illustrates a configuration plan 500 of the industrial control system of the second exemplary embodiment.

FIG. 14 shows a functional configuration of a network packet 7 according to the second exemplary embodiment. Reference is made to FIG. 14 and FIG. 13. The network packet 7 comprises a packet header 701 and payload data 702. The network packet 7 may be a UDP packet. The packet header 701 comprises routing information 710 and a data identifier 711. The routing information 710 may comprise an IP address, a port and the like of a receiving control application 1313. According to the second exemplary embodiment, when a control application such as control application 113 initially creates a network packet 7, the routing information 710 is set to a dummy value that does not indicate any existing destination. However, the freshly created network packet 7 comprises the data identifier 711 which identifies the type of data transported by the network packet 7. The data identifier 711 may identify, merely as an example, that the payload data 702 is sensor-data from a specific sensor. As such, the data identifier 711 may comprise one or more of a data type ID, a sensor ID, and the like. The sensor data identifier 711 may be embodied as a separate data field in the packet header 701. Alternatively, the sensor data identifier 711 may be encoded by the dummy routing information 710, i.e., a specific dummy destination IP address and/or port may be associated with each data type ID, sensor ID, and the like.

That is, the control applications 1313 create network packets 7 that comprise no valid routing information 710, but comprise a valid data identifier 711. The data identifier 711 may be a numeric ID or other suitable identifier that identifies the kind of data that the payload 702 contains, such as, for example, "temperature data from sensor number x", "switch number x depressed" and the like. The task of properly addressing and routing the network packets 7 to all other control applications 1313 is left to an orchestration facility 550 of the industrial control network 1. The orchestration facility 550 has a configuration plan 500, which may be edited by a human user or by further technical means, is configured to derive a communication mapping of the industrial network 1 from the configuration plan 500, and cause the individual industrial control devices 100, 200, 300 to implement the communication mapping.

FIG. 15 illustrates an exemplary configuration plan 500 of the industrial control system 1 of the second exemplary embodiment. Reference is made to FIG. 13-15. The configuration plan 500 comprises, for each of the control applications 1313, a corresponding control application entry 511, 512. For each control application entry 511, 512, the configuration plan 500 specifies a control application identifier 501 identifying the respective control application 1313, a control device identifier 502 specifying the industrial control device 100, 200, 300 on which the control application 1313 is installed, a container identifier 503 specifying which container (110, 120 in FIG. 3) the control application 1313 is installed in, a number of transmission data identifiers 504 each specifying a specific kind of data that is transmitted by the respective control application 1313, and a number of reception data identifier 505 each specifying a specific kind of data that the respective control application 1313 wishes to receive. The format of the transmission data identifiers 504 and the reception data identifiers 505 may correspond to the format of the data identifier 711 comprised in the network packet 7 described above in connection with FIG. 14. It will be appreciated that it is possible to derive, automatically from the configuration plan 500, a communication mapping of the industrial control network 1, i.e., a mapping that specifies which control applications 1313 transmit which kinds of data to which other control applications 1313.

With further reference to FIG. 13-15, the orchestration facility 550 derivers the communication mapping from the configuration plan 500 and transmits at least a respective portion of the communication mapping to the real-time container agents 104, 204, 304 of the respective industrial control devices 100, 200 300. According to the second exemplary embodiment, the respective real-time container agent 104, 204, 304 further comprises an orchestration functionality that is configured to implement the received portions of the communication mapping on the respective industrial control devices 100, 200, 300.

Herein, the idea is that after the network packet 7, which contains no valid routing information 710, is sent by the respective control application 1313, some component of the corresponding industrial control device 100, 200, 300 determines, based on the communication mapping, to which one or more of the industrial control devices 100, 200, 300 the network packet 7 is to be transmitted. If more than one industrial control device 100, 200, 300 comprises a control application 1313 which consumes the kind of data specified by the data identifier 711, multicasting is performed, that is, a copy of the network packet 7 is generated for each additional industrial control device 100, 200, 300 to which the network packet 7 is to be sent. Then, network address translation is performed to set the routing information 710 in the packet header 701 to the correct address of the corresponding industrial control device 100, 200, 300 for the network packet 7 or for each of the multicast copies of the network packet 7.

Likewise, some component on the receiving control device 100, 200, 300, upon receiving an ingress remote network packet 7, again checks the data identifier 711 of the received network packet 7 and determines which of the local control applications 1313 containerized on the local industrial control device 100, 200, 300 are to receive the network packet 7 according to the communication mapping specified by the configuration plan 500. If more than one of the local control applications 1313 is to receive the network packet, multicasting is performed, that is, a copy of the network packet 7 is generated for each additional local control application 1313. Then, network address translation is performed on each copy of the network packet 7 to set the routing information 710 in the respective packet header 701 to the correct local address of the virtual network interface 111, 121, 211, 221, 311, 321 of the respective local control application 1313.

In this way, flexibility is obtained in designing and redesigning a distributed embedded control application. When the communication mapping changes, a new configuration plan 500 can be provided, and the orchestration facility 550 in combination with the realtime container agents 104, 204, 304 and the further component of the industrial control systems 100, 200, 300 automatically adapts the addressing, multicasting and routing of the network packets 7, while no changes are necessary in the code and configuration of the actual control applications 1313.

As the "some component", that performs orchestration operations such as network translation, multicasting and the like, a firewall such as Linux iptables has conventionally been used. However, a problem occurs when time-deterministic dynamic updates are required.

Figure 16:
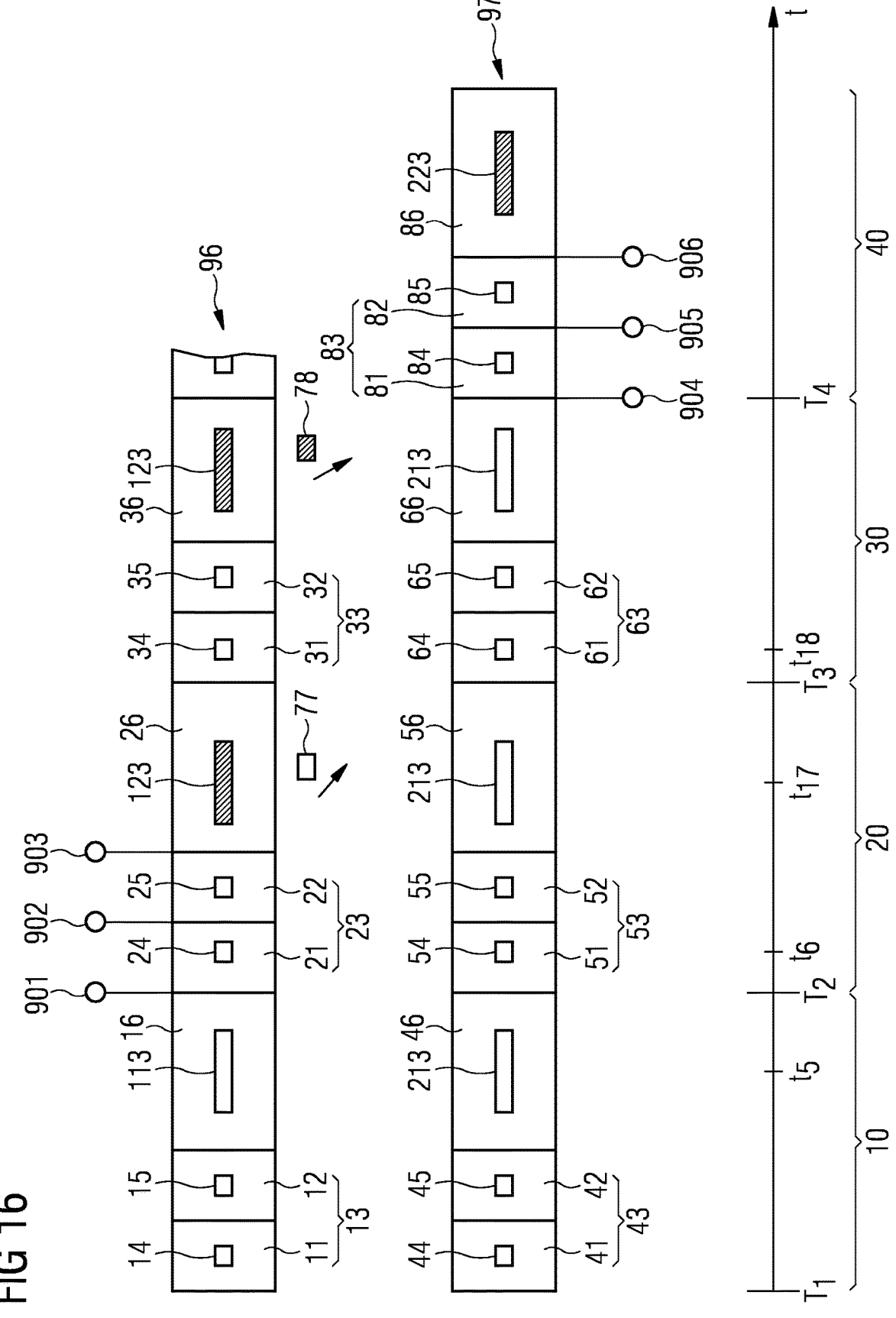
FIG. 16 shows a schematic diagram illustrating a functional configuration of a queuing discipline according to the second exemplary embodiment.

Still with reference to FIG. 13-FIG. 15, let us consider a case in which some of the control applications 1313 are updated to use a newer data protocol format for the same kind of data, i.e., data having the same data identifier 711,

504, 505. For example, consider a case in which control application 113 containerized on industrial control device 100 transmits network packets 77 (FIG. 16) having a specified data format to control application 213 containerized on industrial control device 200. Furthermore, consider that control application 123 is an updated version of control application 113, and control application 223 is a corresponding updated version of control application 213. The updated control applications 213, 223 performs the same function, but use a different payload data 702 format for its network packets 78 (FIG. 16). When the control applications 113, 213 are updated to the control applications 213, 223, it is important to also update the orchestration in such a way that all packets transmitted from control application 113 reach control application 213 and all packets transmitted from control application 123 reach control application 223, and that in any given cycle, only one of the pairs of control application 113, 213, or control applications 123 and 223 communicate with each other. This task is aggravated by the fact, that, as described for the first exemplary embodiment, it takes two cycles for any remote network packet 7 to travel from its original to its destination.

FIG. 16 shows a timing diagram used for illustrating an example of a reconfiguration in the industrial control system 1 according to the second exemplary embodiment. Specifically, FIG. 16, shows processing stages 96 of a first real-time container agent 104 (FIG. 13) of a first industrial control device 100 (FIG. 13) and processing stages 97 of a second real-time container agent 204 (FIG. 13) during four cycles 10, 20, 30, 40. Reference is made to FIG. 13-16.

In each of the cycles 10, 20, 30, 40, the respective real-time container agents 104, 204 perform maintenance processing 13, 23, 33; 43, 54, 63, 83 each comprising output processing 11, 21, 31, 41, 51, 61, 81 including transmitting a move command 14, 24, 34, 44, 54, 64, 84 to the egress queuing disciplines 151, 152 (FIG. 3), and input processing 12, 22, 32, 42, 52, 62, 82 including transmitting a move command 15, 25, 35, 45, 55, 65, 85 to the ingress queuing disciplines 150 (FIG. 3) of the respective industrial control devices 100, 200, 300. After finishing the maintenance processing 13, 23, 33, 43, 53, 63, 83, control program execution 16, 26, 36, 45, 56, 66, 86 is performed in each cycle 10, 20, 30, 40. For details, reference is made to the description of the first exemplary embodiment.

The control program execution 16, 26, 36, 46, 56, 66, 86 stages, in FIG. 6, show which of the two versions of the control applications 113, 123; 213, 223 is in service in the respective cycle 10, 20, 30, 40. Being in service means, in particular, that network packets generated by the control application 1313 that is in service are transmitted on and received from the physical network 2. Being out of service means that no network packets are routed from or to the control application 1313 that is out of service.

Specifically, as shown in FIG. 16, control application 113 is taken out of service after cycle 10, and control application 123 is taken into service in cycle 20. Correspondingly, two cycles later, control application 213 is taken out of service after cycle 30, and control application 223 is taken into service in control cycle 40.

In cycle 10, control application 113 creates, at time t5, a network packet 77 using the older data format. Network packet 77 is held back in egress queuing discipline 151 until after the move command 24 is issued to the egress queuing discipline 151 in cycle 20. In cycle 20, network packet 77 is transmitted over physical network 2 to control device 200 and enqueued in ingress queuing discipline 250. There, it is held back until after the move command 65 is issued to the ingress queuing discipline 250. Then, in execution phase 66 of the second industrial control device 200 in the third cycle 30, network packet 77 is received by control application 213, which understands the older data format.

Correspondingly, in cycle 20, control application 213 creates, at time t17, a network packet 78 using the newer data format. Network packet 78 is held back in egress queuing discipline 151 until after move command 34 is issued to the egress queuing discipline 151 in the third cycle 30. In the third cycle 30, network packet 78 is transmitted over physical network 2 to control device 200, where it is enqueued in ingress queuing discipline 250. There, it is held back until after move command 85 is issued to ingress queuing discipline 250 in the fourth cycle 40. Then, in execution phase 86 of the second industrial control device 200 in the fourth cycle 40, network packet 78 is received by the updated control application 223, which understands the newer data format.

Herein, attention is drawn to the fact that in cycle 20, both network packet 77 (enqueued and then released by move command 25), which is to be routed to control application 213, and network packet 78 (freshly enqueued), which is to be routed to control application 223, pass through the network stack of the first industrial control device. Furthermore, another network packet 77 could become freshly enqueued in cycle 20 if control application 113 continues to be executed; however, said another network packet 77 is not to be routed anywhere and should be discarded.

Now, assume that, after control application 213 is taken out of service, i.e., in the maintenance processing 23 of the second cycle 20, the first real-time container agent 104 simply reconfigures a standard firewall, such as Linux iptables, to stop readdressing and forwarding network packets 77 of the older data format. In this case, the network packet 77, which was created in the first cycle 10, but still remains enqueued in egress queuing discipline 151 (FIG. 9) until some time after move command 24 is issued to the ingress queuing discipline 151 in the second cycle 20, would probably not be forwarded to the second industrial control device 200. More particularly, if the network packet 77 only passes the firewall after its reconfiguration, the readdressing rule that could match network packet 77 is already deleted.

Even if the first real-time container agent 104 only reconfigures the firewall near the end of the maintenance processing phase 23, there is no guarantee that at this point of time the network packet 77 has already been dequeued and has already traversed the standard firewall. Therefore, when using standard firewalls for orchestration, there is still a race condition that mike break time-deterministic behavior in the case of an on-the-fly reconfiguration of control applications 122, 123 213, 213 that could lead to a network packet 77 being lost during the reconfiguration.

Time-Deterministic Reconfiguration of a Communication Mapping

In order to achieve time-deterministic reconfiguration, according to the second exemplary embodiment, the real-time container agents 104, 204 do not use a standard firewall for orchestration, but rather use the queuing disciplines 5050 for orchestration.

Figure 17:
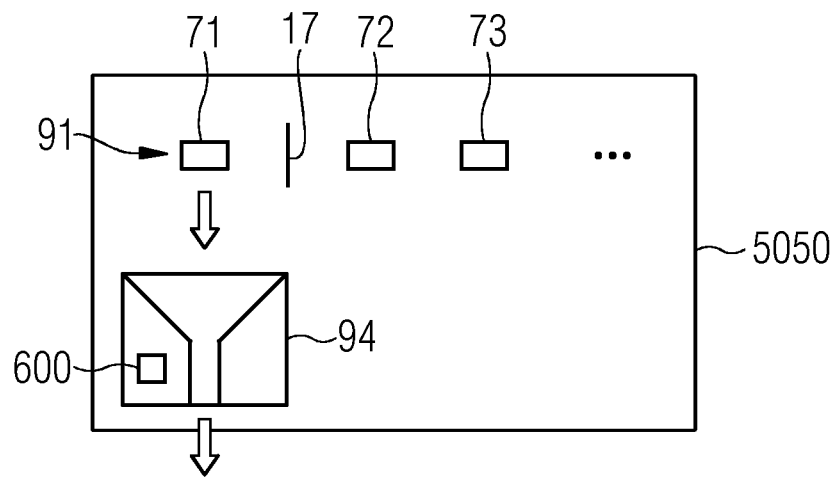
FIG. 17 illustrates a configurable ruleset according to the second exemplary embodiment.

FIG. 17 shows a schematic diagram illustrating a functional configuration of a queuing discipline 5050 according to the second exemplary embodiment. The queuing discipline 5050 of the second exemplary embodiment is similar to the queuing disciplines 5050 of the first exemplary embodiment, and similar features will not be described again.

In addition to the functionality for managing network packets 71, 72, 73 the queue 91, maintaining the barrier timestamp 17 and holding back network packets 72, 73 which are newer than the barrier timestamp 71, the queuing discipline 5050 further comprises a filtering unit 94. The filtering unit 94 has a configurable ruleset 600 and processes a network packet 71, upon being dequeued from the queue 91, according to the configurable ruleset 600. That is, when a dequeuing request is received in the situation shown in FIG. 17, network packet 71, that is older than the barrier timestamp 17, will first be processed by the filtering unit 94 according to the configurable ruleset 600 before being released from the queue 91.

Figure 18:
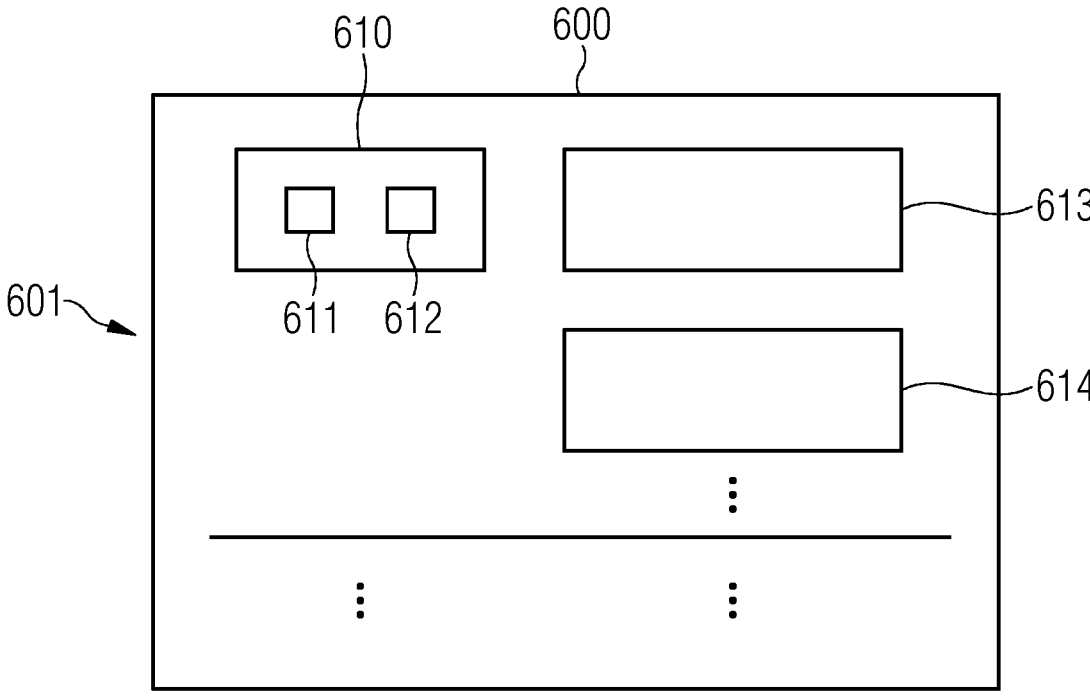
FIG. 18 shows method steps of a method of operating an industrial control device according to the second exemplary embodiment.

FIG. 18 illustrates the configurable ruleset 600 according to the second exemplary embodiment. Reference is made to FIG. 17 and FIG. 18. The configurable ruleset 600 comprises a number of rules 601. Each rule 601 comprises a matching clause 610 and a number of action clauses 613, 614. The matching clause 610 comprises a packet header criterion 611 and a timestamp criterion 612.

When a network packet 71 is dequeued from queue 91 of the queuing discipline 5050, the filtering unit 94 compares the header criterion 611 of the matching clause 610 against the header 701 of the network packet 71. If the header criterion 611, which may comprise regular expressions, wildcard statements, and the like, matches the header 701 of the network packet 71, the filtering unit 94 further compares the timestamp criterion 711 of the matching clause 610 against the timestamp associated with the network packet 71 in the queue 91. The timestamp criterion 711 may comprise statements such as "timestamp older than . . . ", "timestamp not older than . . . ", "timestamp newer than . . . ", "timestamp not newer than . . . " and the like. If the network packet 71 matches both the header criterion 611 and the timestamp criterion 612, the filtering unit 94 proceeds to process the network packet 71 according to each of the action clauses 613, 614 specified for the corresponding rule 601.

In this way, using the matching clause 610 comprising both the header criterion 611 and the timestamp criterium 612, it is advantageously possible to filter for network packets 71 that both have a certain data identifier 711 and that belong to (have been created in or have been received in) one or more specific time cycles 10, 20, 30, 40 (FIG. 16).

Reference is made to FIG. 13 FIG. 18. The action clauses 613, 614 may specify one or more of the following actions:

A first configurable action a) is an action of performing network address translation on the network packet 7. 71. Network address translation refers to rewriting the routing information 710 comprised in the packet header 701. Action a) can advantageously be used for orchestration purposes. That is, the matching clause 610 can be used to match network packets 7, 71 having a specific data identifier, and action clause 613, 614 specifying action a) can be used to route rewrite the routing information 710 in the packet heard 701 of the network packet 7, 71 so as to route the network packet 7, 71 to its proper recipient.

A second configuration action b) is an action of cloning the network packet 7, 71 and shortlisting the cloned network packet. A third configurable action c) is an action of immediately releasing (dequeuing) the network packet 7, 71 if the network packet is shortlisted. Herein, shortlisting may comprise adding a shortlisting flag to the cloned network packet. Cloning may comprise creating a copy of the network packet 7, 71 and properly adjusting the routing information 710 in the copy of the network packet 7, 71. Actions b) and c) can be used in conjunction for performing multicasting. That is, upon each dequeuing request, only a single network packet 7, 71 can be dequeued. However, if a clone of the network packet 7, 71 is created to achieve multicasting using action b), the clone will then be immediately dequeued upon the next dequeuing request without undergoing further filtering using action c).

A fourth configurable action is an action d) of capturing a copy of the network packet 7, 71 for later replay. A capture and replay functionality of the queueing discipline 151 can advantageously be used to patch broken links during recon-figuration. Consider, for example, a reconfiguration in which control switches back and forth from remote communication between control applications 1313 executing on different industrial devices 100, 200, 300, which are delivered after two cycles, to local communications between control appli-cations 1313 executing on the same industrial control device 100, 200, 300, which are delivered after one cycle. In said switching, a gap will appear in which one cycle 10, 20, 30, 40 remains without reception of any network packet 7, 77, 78. In this case, a network packet 7 transmitted in the previous cycle 10, 20, 30, 40 may be captured and then retransmitted one cycle 10, 20, 30, 40 later to close the gap. The retransmission may be requested by the respective real-time container agent 104, 204, 304 requesting retrans-mission with the respective queuing discipline 5050.

A fifth configuration action is an action e) of dropping the network packet 7, 71 if a per-cycle-quota for the network packet 7, 71 is depleted in the current cycle 10, 20, 30, 40. By configuring per-cycle-quotas for network packets 7, 71 that match certain criteria 611, 612, it may be possible to avoid network congestion and ensure adherence to the real-time requirements. For example, certain bulk traffic may be considered optional and may be dropped without negative consequences if a quote is exceeded. Alternatively, an error condition may be raised, or a halt may be per-formed, in case a quota for essential network traffic is exceeded.

The configuration described for queuing discipline 5050 of the second exemplary embodiment are applicable both to ingress queuing disciplines 150, 250 as well as to egress queuing disciplines 151, 152, 251, 252 the second exem-plary embodiment. If the queuing discipline 5050 maintains two separate queues 92, 93 (FIG. 5), such as the ingress queuing disciplines 150, 250, any network packet 71, 74 to be dequeued can be processed by the same filtering unit 94 using the same filtering ruleset 600, or there can be different filtering rulesets 600 for local packets 71 and for remote packets 74 to be dequeued.

That is, the queuing disciplines 5050 of the second embodiment implement core firewalling functionality that can advantageously be used to perform orchestration in a time-deterministic manner, that is precisely at the time of dequeuing a network packet 71 from the respective queuing discipline 5050, and more specifically, only for network packets 7, 71 that fulfill a specific timestamp criterion 612 (that belong to a specific cycle 10, 20, 30, 40).

Figure 19:
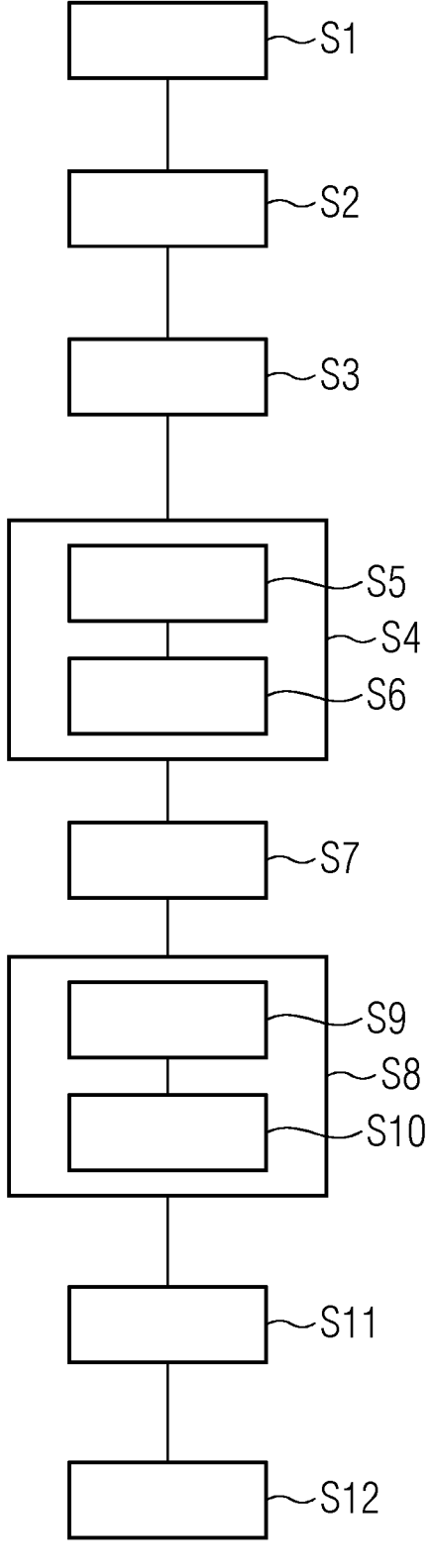
FIG. 19 shows a timing diagram used for illustrating an example of a reconfiguration in the industrial configuration according to the second exemplary embodiment.

FIG. 19 shows method steps of a method of operating an industrial control device 100, 200, 300 according to the second exemplary embodiment. With reference to FIGS. 13-19, it will now be described how the real-time configu-ration agents 104, 204, 304 of each of the industrial control devices 100, 200, 300 uses the above-described firewalling functionality of the queuing disciplines 5050 to perform orchestration.

Steps S1 to S12 are being carried out on each of the industrial control systems 100, 200, 3000 in each cycle 10, 20, 30, 40.

Steps S1, S2, S4, S5, S6, S8, S9, S10, S12 correspond to the steps of the method of the first exemplary embodiment described in connection with FIGS. 7 and 11. That is, in step S1, the real time container agents 104, 204, 304 initialize. In step S2, the real-time container agents 104, 204, 304 syn-chronize the start times T1, T2, T3, T4 of the cycles 10, 20, 30, 40 among each other. In step S4, output processing 11, 21, 31, 41, 51, 61, 81 is performed, which comprises transmitting, S5, a move command 14, 24, 34, 44, 54, 64, 84 to corresponding egress queuing disciplines 5050 and the egress queuing disciplines 5050 adjusting S6 their barrier timestamps 17 (FIG. 3). In step S8, after step S4 is finished, input processing 12, 22, 32, 42, 52, 62, 82 is performed, which comprises transmitting S9 a move command 15, 25, 35, 45, 55, 65, 85 to corresponding ingress queuing disci-plines 5050 and the ingress queuing disciplines 5050 adjust-ing S10 their barrier timestamps 18, 19 (FIG. 4). In step S12, after the maintenance processing 13, 23, 33, 43, 53, 63, 83 is completed, the real-time container agents 104, 204, 304 cause execution of the respective control applications 1313 containerized on the respective industrial control system 100, 200, 300 for the remainder of the respective cycle 10, 20, 30, 40.

In addition, the method further comprises a reconfigura-tion step S3 that is executed before the output processing step S4, a reconfiguration step S7 that is executed between the output processing step S4 and the input processing step S8, and a reconfiguration step S11 that is executed after the input processing step S8.

During each of the reconfiguration steps S3, S7 and S11, the respective realtime container agent 104, 204, 304 may, if required, implement an updated communication mapping by reconfiguring the configurable rulesets 600 of the respec-tive queuing disciplines 550. The timepoints before, between and after the output processing S4 and the input processing S8, at which the reconfiguration steps S3, S7, S11 can be executed, are indicated as respective reconfiguration hooks 901, 902, 903, 904, 905, 906 in the timing diagram in FIG. 16.

In order to achieve time-deterministic reconfiguration in the specific example that was discussed hereinabove with reference to FIG. 16, the following processing is performed:

In the second cycle 20, on the first industrial control device 100 (band 96), at the reconfiguration hook 901 before the output processing 21, the real-time container agent 104 reconfigures the egress queue 151. More specifically, the real-time container agent 104 locates an existing rule 601 of the configurable ruleset 600 of egress queue 151 which carries out, via one of its action clauses 613, 614, network address translation that causes routing of network packets 77 transmitted by the control application 113, via the physical network interface 101, toward the second industrial control device 200. The real-time container agent 104 then changes the timestamp 612 criterion of the located rule 601 to "timestamp<=T2". The real-time-container agent 104 fur-thermore flags the rule 601 for deletion after time T3. In this way, the rule 601 remains active throughout the second cycle 10 and will apply to network packet 77, which is associated with the timestamp t5<T2. However, rule 601 will advan-tageously not apply to network packets 77, 78 that are generated in the second cycle 20 and have a timestamp that is newer than T2. Also, rule 601 will be deleted after the second cycle 20 is finished. The deletion of rules 601 that are flagged for deletion may be, for example, carried out by a garbage collection process that is performed every cycle, or upon every reconfiguration, or in predetermined time inter-vals, or the like.

Furthermore, also at the reconfiguration hook 901, the real-time container agent 104 creates, in the configurable ruleset 600 of egress queue 152 of the first industrial control device 100, a new rule 602 that has an action clause 613, 614 that performs network address translation to cause routing of network packets 78 transmitted by the control application 123, via the physical network interface 101, toward the second industrial control device 200. The timestamp criterion 612 of the new rule 602 is set to "timestamp>T2". In this way, the newly configured rule 602 will apply to the network packet 78 that is transmitted by control application 123 in the second cycle 20, but will not apply to any similar network packets that might already be enqueued in the egress queuing discipline 152 resulting from a previous execution of control application 123, when not yet in service, such as during the first cycle 10.

Similarly, in the fourth cycle 40, on the second industrial control device 200 (band 97), at the reconfiguration hook 905 between the output processing 84 and the input processing 85, the real-time container agent 204 reconfigures the ingress queuing discipline 250. More specifically, the real-time container agent 204 locates an existing rule 601 of the configurable ruleset 600 of ingress queue 150 which carries out, via one of its action clauses 613, 614, network address translation that causes routing of network packets 77 received over the network 2 via physical network interface 201, to the virtual network interface 211 that is used by control application 213. The real-time container agent 204 then changes the timestamp 612 criterion of the located rule 601 to "timestamp<T3" and/or deletes the located rule 601. In this way, network packets 77 that still arrive in cycle 30 will not be forwarded to control application 213 starting from the fourth cycle 40.

Furthermore, also at the reconfiguration hook 905, the real-time container agent 204 creates, in the configurable ruleset 600 of egress queuing discipline 252 of the second industrial control device 200, a new rule 602 that has an action clause 613, 614 that performs network address translation to cause routing of network packets 78 received over the network 2 via physical network interface 201 to the virtual network interface 212 that is used by the control application 223. The timestamp criterion 612 of the new rule 602 is set to "timestamp>T3". In this way, when network packet 78 will be dequeued after the move command 85 will have been issued in the fourth cycle, the newly configured rule 602 will apply to the network packet 78 even though it carries a timestamp T3<tx<T4, because it has been received and enqueued in the ingress queue 250 in the previous cycle 30.

The reconfiguration processing described hereinabove with reference to FIG. 16 is merely an example. The skilled person will appreciate that even for the case described above, reconfiguration hooks 901 and 905 are not the only possible reconfiguration hooks 901-906 that can be used to perform the reconfiguration. Furthermore, a large plurality of different reconfiguration scenarios is conceivable, such as moving control applications 1313 from one industrial control device to another, and the like.

In each such case, the precise decisions as to what rules 601 are to be configured at which of the configuration hooks 901-906 with which timestamp criteria 611 can be made by a human operator and can be appended to the configuration plan 500. Alternatively, these decisions can be made automatically by the orchestration engine 500 and/or by the realtime configuration agents 104, 204, 304 based on an automated analysis of the configuration plan 500 and/or the communication mapping derived therefrom.

In summary, according to the second exemplary embodiment, when correct rules 601, 602 are configured with the correct timestamp criteria 612, then for every conceivable reconfiguration scenario, it is possible to formulate the rules 601, 602 such that the reconfiguration is performed in a time-deterministic fashion, in which only the desired network packets 77, 78 are forwarded and undesired network packets are discarded and in which no gaps and no race conditions occur.

This technical effect is facilitated, in particular, by the feature according to which the ruleset 600 is executed at defined points in time, i.e. upon dequeuing of the a network from the respective queuing discipline 5050; the feature according to which reconfiguration can be performed at defined points in time, i.e. before output processing S4, between output processing S4 and input processing S8, or after input processing S8; and the feature according to which each configurable rule can have a timestamp criterion 611 that specifies a temporal aspect defining to which network packets 7 the rule is to applied 611 based on their associated timestamps.

Although embodiments of the present invention has been described in accordance with exemplary embodiments, it is obvious for the person skilled in the art that modifications are possible in all embodiments.

In the first exemplary embodiment, an ingress queuing discipline 150 is associated with the physical network interface 101, and respective egress queuing disciplines 151, 152 are associated with the respective virtual network interfaces 111, 121. However, other configurations are possible. For example, if multicasting is not required for ingress network packets 7, also no queuing discipline could be associated with the physical network interface 101, and a respective ingress queuing discipline 150 could be associated with each of the virtual network interfaces 111, 121. Alternatively, if local communications between a plurality of control applications is not desired, or if no time-determinism is required for such local communications, it is also conceivable to have no queuing disciplines with barrier functionality associated with the virtual network interfaces 111, 121, and to associate both a single egress queuing discipline 151 and a single ingress queuing discipline 152 with the physical network interface 101.

Figure 20:
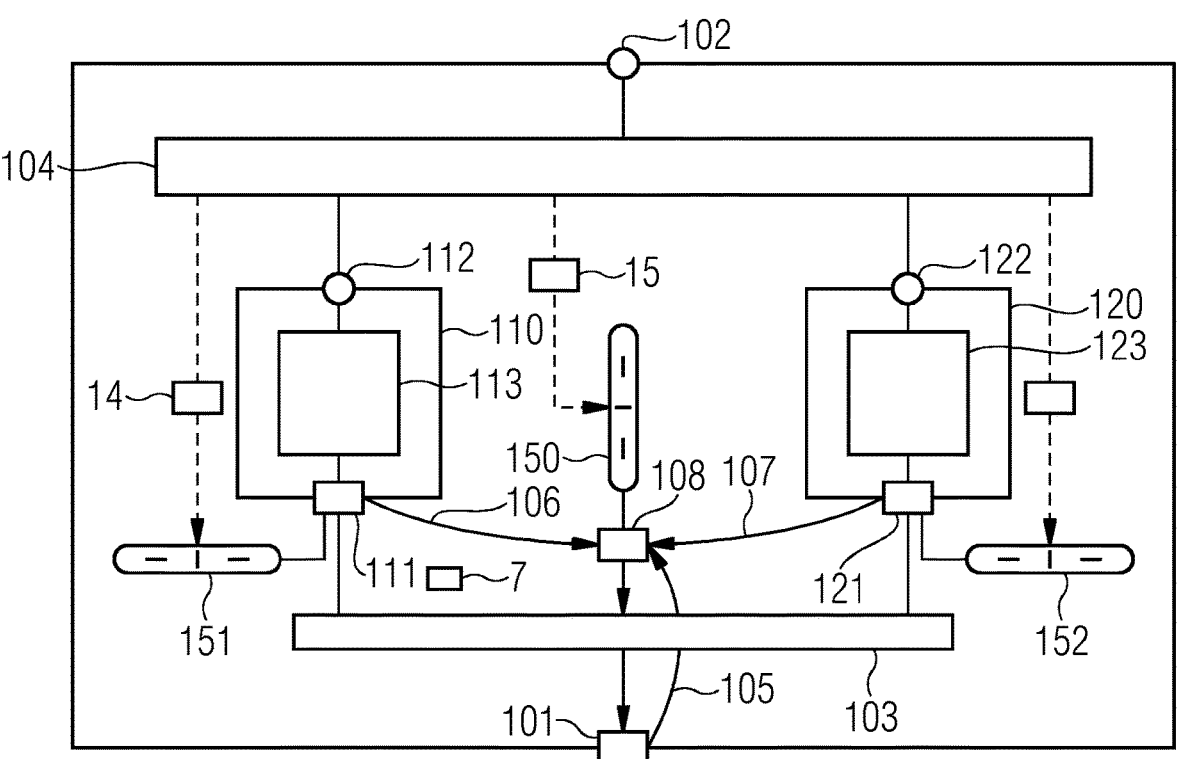
FIG. 20 shows a schematic diagram illustrating a functional configuration of an industrial control device according to a modification example.

FIG. 20 shows a functional configuration of another possible modification example of an industrial control system 100 that is compatible with either the first or the second exemplary embodiment. Also in the modification example, egress queuing disciplines 151, 152 are associated with each of the virtual network interfaces. However, unlike the configuration shown for the exemplary embodiments, in the modification example, the virtual network interfaces 111, 121 and the physical network interface 101 are interconnected using a virtual bridge 103. In this way, egress network packets 7 that are dequeued from the egress queues 151, 152 are put onto virtual bridge 103 and directly reach their destination (which may be the physical network interface 101 or another one of the virtual network interfaces 111, 121). A further dummy virtual network interface 108 is provided, and the common ingress queuing discipline 150 is associated with the dummy virtual network interface 108. Local network packets that are transmitted from the control applications 113, 123 to another one of the control applications 113, 123 are not put onto the virtual bridge 103, but are redirected, from the virtual network interfaces 11, 121, via redirections 106, 107, to the virtual network interface 108. Remote ingress network packets that arrive at the physical network interface 101 are also not put onto the virtual bridge

103, but are redirected, via redirection 105, to the virtual network interface 108. Upon arriving at the virtual network interface 108, the local or remote ingress network packets are enqueued in the common ingress queuing discipline 150. The dummy network interface is unidirectionally connected to the virtual bridge 103 such that local or remote ingress network packets that are later dequeued from the common ingress queuing discipline 150 are put on the virtual bridge 103 and can then directly reach their final destination—either one of the virtual network interfaces 111, 121.

The configuration of the modification example shown in FIG. 20 that has the common ingress queuing discipline directly associated only with the dummy virtual network interface 108 advantageously allows the common ingress queuing discipline 150 to be indirectly associated with each of the virtual network interfaces 111, 121 and the physical network interface 101 using the redirections 105, 106, 107. This configuration is applicable to operating systems that only allow a single direct association of a queuing discipline with exactly one network interface. Also, bridging and redirecting may be more efficient than routing. The modification example advantageously avoids internal routing of local network packets 7 via the physical network interface 101.

In the exemplary embodiments and the modification example, the ingress queuing discipline 150 manages two separate queues 92, 93, one for local network packets 7 and one for remote network packets 7. However, it is also possible to manage local and remote ingress network packets in a single queue 91 while still applying different barrier timestamps 18, 19 to local versus remote network packets 7 in the single queue 91. Still further, if expedited delivery in the next cycle of local network packets 7 is not required, also the ingress queuing discipline 150 may only use a single barrier timestamp 17 with a single queue 91, and adjust the single barrier timestamp 17 to the local execution time as indicated 90 in the move command 15. In this case, also local network packets 7 will be delivered in the second cycle after the cycle in which they have been created, similarly to remote network packets 7. Such a configuration may even be advantageous because, when a receiving control application 123 that has been receiving local network packets from a transmitting control application 123 on the same industrial control device 100 is moved to a different industrial control device 200, no gap in communications occurs and no capture and replay is necessary.

In the exemplary embodiments, timestamps are associated with the network packets 7 by the queuing disciplines 150, 151, 152 when they are enqueued in the respective queuing discipline 150, 151, 152. However, it may also be the case that network packets 7 are associated with timestamps upon local creation (egress packets) and/or upon reception 8 (ingress packets) e.g., by a network driver, network stack or similar of the operating system of the industrial control device 100. In this case, these pre-existing timestamps can be used by the respective queuing disciplines 150, 151, 152. As long as the timestamps are not transmitted over the physical network 2 and/or are updated upon reception via the physical network 2, that is, as long as the timestamps allow determining a cycle of creation for egress network packets and allow determining a cycle of reception for ingress network packets, such timestamps also achieve the described effects.

At various places, references have been made to the Linux operating system, and Linux terminology such as "qdisc" has been used. However, the skilled person will appreciate that any operating system with networking capability, including free operating systems, proprietary operating systems, POSIX and non-POSIX operating systems can be used to implement the disclosed features. Moreover, features that were disclosed as software may also be embodied by hardware, such as by a custom ASIC, custom processing unit and the like.

In FIGS. 3, 9 and 13, the respective industrial control device 100, 200 comprises two control applications 113, 123 or 213, 223. However, it will be appreciated that any of the industrial control devices 100, 200, 300 can also comprise only a single control application 1313, or can also comprise a plurality of three or more control applications 1313.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

ADDITIONAL LITERATURE

[1] Telschig, Knapp: "Towards Safe Dynamic Updates of Distributed Updates of Distributed Embedded Applications in Factory Automation", 2017, $22^{nd}$ IEEE International Conference on Emerging Technologies and Factory Automation

[2] Telschig, Schonberger, Knapp: "A Real-Time Container Architecture for Dependable Distributed Embedded Applications", 2018, $14^{th}$ IEEE International Conference on Automation Science and Engineering (CASE)

[3] Telschig, Knapp: "Synchronous Reconfiguration of Distributed Embedded Applications during Operation", 2019, IEEE International Conference on Software Architecture (ICSA)

[4] Telschig, Knapp: "Time-Critical State Transfer during Operation of Distributed Embedded Applications", 2019, $17^{th}$ IEEE International Conference on Industrial Informatics (INDIN)

REFERENCE NUMERALS 1 industrial control system
2 physical network
3 technical device
4 technical device
5 processor
6 memory
7 network packet
8 storage
9 bus
10 first cycle
11 output processing
12 input processing
13 maintenance processing
14 move command
15 move command
16 control application execution
17 barrier timestamp
18 barrier timestamp
19 barrier timestamp
20 second cycle
21 output processing
22 input processing

35

23 maintenance processing
24 move command to egress queuing discipline
25 move command to ingress queuing discipline
26 control application execution
27 barrier timestamp
28 barrier timestamp
29 barrier timestamp
30 third cycle
31 output processing
32 input processing
33 maintenance processing
34 move command
35 move command
36 control application execution
37,38 barrier timestamps
40 fourth cycle
41 output processing
42 input processing
43 maintenance processing
44 move command
45 move command
46 control application execution
47,48 barrier timestamps
51 output processing
52 input processing
53 maintenance processing
54 move command
55 move command
56 control application execution
57,58 barrier timestamps
61 output processing
62 input processing
63 maintenance processing
64 move command
65 move command
66 control application execution
71-78 network packets
81 output processing
82 input processing
83 maintenance processing
84 move command
85 move command
86 control application execution
90 timestamp indicating logical execution time
91 queue
92 local queue
93 remote queue
94 filtering unit
95 processing phases of real-time container agent
96 processing phases on first industrial control device
97 processing phases on second industrial control device
100 industrial control device
101 physical network interface
102 physical I/O port
103 virtual bridge
104 real-time container agent
105-107 redirections
108 dummy virtual network interface
110 container
111 virtual network interface
112 virtual I/O port
113 control application
122 virtual I/O port
121 virtual network interface
123 control application
150 ingress queuing discipline
151 egress queuing discipline

36

152 egress queuing discipline
250 ingress queuing discipline
251 egress queuing discipline
252 egress queuing discipline
200 industrial control device
201 physical network port
202 physical I/O port
204 real-time container agent
211 virtual network interface
213 control application
221 virtual network interface
223 control application
300 industrial control device
311 virtual network interface
313 control application
321 virtual network interface
323 control application
500 configuration plan
501 control application identifiers
502 control device identifiers
503 container identifiers
504 transmission data identifiers
505 reception data identifiers
511,512 control application entries
550 orchestration facility
600 configurable ruleset
601 rule
610 matching clause
611 header criterion
612 timestamp criterion
613,614 action clauses
701 packet header
702 payload data
710 routing information
711 data identifier
901 reconfiguration hook before output processing
902 reconfiguration hook between I/O processing
903 reconfiguration hook after input processing
904 reconfiguration hook before output processing
905 reconfiguration hook between I/O processing
906 reconfiguration hook after input processing
1313 control application(s) (generic/collective reference sign)
5050 queueing discipline(s) (generic/collective reference sign)
S1-S12 method steps
t time
T1-T4 cycle start times, logical execution times
$t_n$ points in time

The invention claimed is:

1. An industrial control device for an industrial control system comprising a plurality of industrial control devices, the industrial control device being configured to execute a number of control applications in constant cycles and comprising:

a number of containers each containerizing a respective one of the control applications;

a plurality of network interfaces comprising a physical network interface of the industrial control device and a plurality of virtual network interfaces of the respective containers;

a plurality of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline;

a real-time container agent configured to, in each cycle, perform maintenance processing and to cause execution of each of the control applications for a remainder of the cycle only after having finished the maintenance processing, wherein the maintenance processing comprises:

performing, on behalf of the control applications, output processing and input processing with a technical device connected to the industrial control device; and transmitting, to each of the queuing disciplines, a move command instructing the respective queuing discipline to advance its barrier timestamp, wherein:

the move command comprises a timestamp indicating a logical execution time, which is the start time of the respective cycle, and the respective queuing discipline is configured to, in response to receiving the move command, adjust its barrier timestamp based on the logical execution time indicated by the timestamp comprised in the move command.

2. The industrial control device of claim 1, wherein the maintenance processing comprises:

synchronizing the start time of each cycle with real-time container agents of the other industrial control devices of the industrial control system.

3. The industrial control device of claim 1, wherein the respective queuing discipline is configured to, upon enqueuing a network packet that does not yet have a timestamp, associate a timestamp to the network packet that indicates a current time.

4. The industrial control device of claim 1, wherein the respective queuing discipline is configured to set the logical execution time of the current cycle or the logical execution time of the next cycle as its barrier timestamp.

5. The industrial control device of claim 1, wherein the plurality of queuing disciplines comprises:

a common ingress queuing discipline associated with the physical network interface of the industrial control device and configured to manage network packets that are incoming via the physical network interface in a queue, and a respective egress queuing discipline associated with each of the virtual network interfaces of each of the containers and configured to manage network packets that are outgoing via the respective virtual network interface in a queue.

6. The industrial control device of claim 5, wherein the common ingress queuing discipline is further associated with each of the virtual network interfaces, comprises a first queue and a second queue and is configured to:

enqueue local network packets incoming via one of the virtual network interfaces and outgoing via another one of the virtual network interfaces in the first queue, enqueue remote network packets incoming via the physical network interface in the second queue, maintain a first barrier timestamp used for holding back the local network packets in the first queue and a second barrier timestamp used for holding back the remote network packets in the second queue, and in response to receiving the move command, set the first barrier timestamp to the logical execution time of the next cycle and set the second barrier timestamp to the logical execution time of the current cycle.

7. The industrial control device of claim 5, wherein the maintenance processing comprises, in the following order:

an output processing step of performing the output processing with the technical device and transmitting the move command to each of the egress queuing disciplines, and an input processing step of performing the input processing with the technical device and transmitting the move command to the common ingress queuing discipline.

8. The industrial control device of claim 1, wherein the respective queuing discipline is configured to, upon dequeuing a network packet, process the network packet according to a configurable ruleset.

9. The industrial control device of claim 8, wherein the configurable ruleset is capable of causing, depending on what is configured, one or more of the following kinds of processing of the network packet:

performing network address translation on the network packet;

cloning the network packet and shortlisting the cloned network packet;

immediately releasing the network packet if the network packet is shortlisted;

capturing a copy of the network packet for later replay; and dropping the network packet if a per-cycle-quota for the network packet is depleted in the current cycle.

10. The industrial control device of claim 8, wherein the real-time container agent is configured to, during the maintenance processing, implement a communication mapping of the industrial control system pertaining to the industrial control device by configuring corresponding rules in the configurable ruleset of the respective queuing disciplines.

11. The industrial control device of claim 8, wherein a matching clause configurable for each configurable rule of the configurable ruleset comprises at least one criterion to be matched against a package header of the network packet and at least one criterion to be matched against a timestamp of the network packet.

12. The industrial control device of claim 8, wherein the maintenance processing comprises, in the following order:

an output processing step of performing the output processing with the technical device and transmitting the move command to each of the egress queuing disciplines; and an input processing step of performing the input processing with the technical device and transmitting the move command to the ingress queuing discipline, and the real-time container agent is configured to implement the communication mapping by configuring the configurable rulesets of the respective queuing disciplines at one or more of the following points in time: before the output processing; between the output processing and the input processing; after the input processing.

13. An industrial control system comprising a plurality of the industrial control devices according to claim 1, wherein the physical network interfaces of which are interconnected by the physical network.

14. A method of operating an industrial control system, the industrial control system comprising a plurality of industrial control devices each configured to execute a number of control applications in constant cycles, each industrial control device comprising:

a plurality of containers each containerizing a respective one of the control applications, a plurality of network interfaces comprising a physical network interface of the respective industrial control device and a number of virtual network interfaces of the respective containers, a plurality of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline, and a real-time container agent, the method comprising:

the real-time-container agents of each of the industrial control devices synchronizing a start time of each cycle with each other globally across the industrial control system, after which, in each cycle, each real-time-container agent performs maintenance processing and causes execution of each of the control applications for a remainder of the cycle only after having finished the maintenance processing, wherein the maintenance processing comprises:

performing, on behalf of the control applications of the respective industrial control device, output processing and input processing with a technical device connected to the respective industrial control device, and transmitting, to each of the queuing disciplines of the respective industrial control device, a move command instructing the respective queuing discipline to advance the barrier timestamp, wherein:

the move command comprises a timestamp indicating a logical execution time, which is the start time of the respective cycle, and the method further comprises the respective queuing discipline adjusting, in response to receiving the move command, the barrier timestamp based on the logical execution time indicated by the timestamp comprised in the move command.

15. A computer program product comprising a computer readable hardware storage device comprising instructions which, when run on an industrial control device having a physical network interface for an industrial control system comprising a plurality of industrial control devices, cause the industrial device to:

be configured to execute a plurality of control applications in constant cycles;

form a plurality of containers each containerizing a respective one of the control applications and each having a virtual network interface, form a plurality of queuing disciplines each associated with at least one of the network interfaces and configured to manage network packets that are incoming or outgoing via the respective network interface in a queue, and to hold back, in the queue, network packets having a timestamp that is not older than a barrier timestamp maintained by the respective queuing discipline, form a real-time container agent, wherein the instructions, when run on the industrial control device, further:

cause the real-time container agent to perform, in each cycle, maintenance processing and execution of each of the control applications for a remainder of the cycle only after having finished the maintenance processing, wherein the maintenance processing comprises:

performing, on behalf of the control applications, output processing and input processing with a technical device connected to the industrial control device, and transmitting, to each of the queuing disciplines, a move command instructing the respective queuing discipline to advance its barrier timestamp, wherein the move command comprises a timestamp indicating a logical execution time, which is the start time of the respective cycle, and cause the respective queuing discipline to adjust, in response to receiving the move command, the barrier timestamp based on the logical execution time indicated by the timestamp comprised by the move command.

* * * * *